(12) United States Patent
Yasui et al.

(10) Patent No.: US 11,069,239 B2
(45) Date of Patent: Jul. 20, 2021

(54) EVENT VEHICLE DISPATCH DEVICE, EVENT VEHICLE DISPATCH METHOD, PROGRAM, AND MANAGEMENT SYSTEM

(71) Applicant: HONDA MOTOR CO., LTD., Tokyo (JP)

(72) Inventors: Yuji Yasui, Wako (JP); Kentaro Ishisaka, Wako (JP); Nobuyuki Watanabe, Wako (JP); Kovi Ahego, Wako (JP); Christopher Lang, Wako (JP); Liyan Liu, Tokyo (JP); Yo Ito, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/622,008

(22) PCT Filed: Jun. 15, 2018

(86) PCT No.: PCT/JP2018/022875
§ 371 (c)(1),
(2) Date: Dec. 12, 2019

(87) PCT Pub. No.: WO2018/230698
PCT Pub. Date: Dec. 20, 2018

(65) Prior Publication Data
US 2020/0126419 A1    Apr. 23, 2020

(30) Foreign Application Priority Data
Jun. 16, 2017   (JP) .............................. JP2017-118745

(51) Int. Cl.
*G08G 1/14*      (2006.01)
*B60W 30/06*     (2006.01)
(Continued)

(52) U.S. Cl.
CPC ............. *G08G 1/143* (2013.01); *B60W 30/06* (2013.01); *B62D 53/06* (2013.01); *G08G 1/145* (2013.01); *G08G 1/202* (2013.01)

(58) Field of Classification Search
CPC ........ G08G 1/143; G08G 1/145; G08G 1/202; B60W 30/06; B62D 53/06; G06Q 50/10
(Continued)

(56) References Cited

U.S. PATENT DOCUMENTS

2005/0022134 A1   1/2005   Tokashiki
2008/0143141 A1   6/2008   Ruslanov et al.
(Continued)

FOREIGN PATENT DOCUMENTS

JP   03-044800   4/1991
JP   09-153098   6/1997
(Continued)

OTHER PUBLICATIONS

International Search Report and Written Opinion for International Application Serial No. PCT/JP2018/022875 dated Sep. 11, 2018, 8 pages.
(Continued)

*Primary Examiner* — John A Tweel, Jr.
(74) *Attorney, Agent, or Firm* — Amin, Turocy & Watson, LLP

(57) ABSTRACT

An event vehicle dispatch device includes: an event notifier configured to notify a plurality of vehicles or owners of the vehicles of an event held in an area in which the plurality of vehicles are able to park; and an adjuster configured to adjust the number of vehicles corresponding to vehicle attributes of vehicles arriving at the area based on the vehicle attribute of each of the plurality of vehicles.

10 Claims, 22 Drawing Sheets

(51) Int. Cl.
  *B62D 53/06*   (2006.01)
  *G08G 1/00*   (2006.01)
(58) Field of Classification Search
  USPC .................................................. 340/932.2
  See application file for complete search history.

(56) References Cited

U.S. PATENT DOCUMENTS

| | | | | |
|---|---|---|---|---|
| 2009/0303079 | A1* | 12/2009 | Khim | G08G 1/146 340/932.2 |
| 2010/0036717 | A1 | 2/2010 | Trest | |
| 2011/0101646 | A1 | 5/2011 | Sakita | |
| 2013/0113936 | A1* | 5/2013 | Cohen | G08G 1/14 348/148 |
| 2014/0365250 | A1 | 12/2014 | Ikeda et al. | |
| 2015/0220991 | A1 | 8/2015 | Butts et al. | |
| 2015/0271532 | A1 | 9/2015 | Igarashi | |
| 2016/0063862 | A1* | 3/2016 | Rosen | G08G 1/144 340/932.2 |
| 2016/0121907 | A1 | 5/2016 | Otake | |

FOREIGN PATENT DOCUMENTS

| | | |
|---|---|---|
| JP | 10-254946 | 9/1998 |
| JP | 11-231935 | 8/1999 |
| JP | 2000-035337 | 2/2000 |
| JP | 2001-154733 | 6/2001 |
| JP | 2002-099961 | 4/2002 |
| JP | 2002-288521 | 10/2002 |
| JP | 2003-063301 | 3/2003 |
| JP | 2003-199083 | 7/2003 |
| JP | 2003-259354 | 9/2003 |
| JP | 2003-308265 | 10/2003 |
| JP | 2004-061285 | 2/2004 |
| JP | 2004-192366 | 7/2004 |
| JP | 2004-194007 | 7/2004 |
| JP | 2004-234469 | 8/2004 |
| JP | 2004-362064 | 12/2004 |
| JP | 2005-004407 | 1/2005 |
| JP | 2005-032066 | 2/2005 |
| JP | 2005-056134 | 3/2005 |
| JP | 2005-066745 | 3/2005 |
| JP | 2006-018570 | 1/2006 |
| JP | 2007-080060 | 3/2007 |
| JP | 2007-172378 | 7/2007 |
| JP | 2007-228551 | 9/2007 |
| JP | 2008-103828 | 5/2008 |
| JP | 2008-534372 | 8/2008 |
| JP | 2009-105787 | 5/2009 |
| JP | 2010-204708 | 9/2010 |
| JP | 2010-237411 | 10/2010 |
| JP | 2011-162273 | 8/2011 |
| JP | 2012-108599 | 6/2012 |
| JP | 2013-109469 | 6/2013 |
| JP | 2013-210713 | 10/2013 |
| JP | 2013-214167 | 10/2013 |
| JP | 2014-238831 | 12/2014 |
| JP | 2015-090676 | 5/2015 |
| JP | 2015-093078 | 5/2015 |
| JP | 2015-179414 | 10/2015 |
| JP | 2015-184710 | 10/2015 |
| JP | 2015-184885 | 10/2015 |
| JP | 2015-191264 | 11/2015 |
| JP | 2015-206655 | 11/2015 |
| JP | 2016-065938 | 4/2016 |
| JP | 2016-090274 | 5/2016 |
| JP | 2016-206715 | 12/2016 |
| JP | 2017-033480 | 2/2017 |
| JP | 2017-061168 | 3/2017 |
| JP | 2017-083446 | 5/2017 |
| WO | WO-2017033172 A1 * | 3/2017 ............. G08G 1/147 |
| WO | 2018/230677 | 12/2018 |
| WO | 2018/230678 | 12/2018 |
| WO | 2018/230679 | 12/2018 |
| WO | 2018/230685 | 12/2018 |
| WO | 2018/230691 | 12/2018 |
| WO | 2018/230704 | 12/2018 |
| WO | 2018/230709 | 12/2018 |
| WO | 2018/230720 | 12/2018 |

OTHER PUBLICATIONS

International Search Report for International Application Serial No. PCT/JP2018/022825 dated Sep. 18, 2018, 2 pages.
International Search Report for International Application Serial No. PCT/JP2018/023043 dated Sep. 18, 2018, 4 pages.
International Search Report for International Application Serial No. PCT/JP2018/022929 dated Jul. 17, 2018, 4 pages.
International Search Report for International Application Serial No. PCT/JP2018/022829 dated Aug. 21, 2018, 2 pages.
International Search Report for International Application Serial No. PCT/JP2018/022919 dated Sep. 18, 2018, 4 pages.
International Search Report for International Application Serial No. PCT/JP2018/022875 dated Sep. 11, 2018, 4 pages.
International Search Report for International Application Serial No. PCT/JP2018/022852 dated Sep. 18, 2018, 2 pages.
International Search Report for International Application Serial No. PCT/JP2018/022826 dated Sep. 18, 2018, 8 pages.
International Search Report for International Application Serial No. PCT/JP2018/022991 dated Aug. 21, 2018, 3 pages.
International Search Report for International Application Serial No. PCT/JP2018/022845 dated Sep. 18, 2018, 4 pages.
Carcade In-Car Gaming, Oh Gizmo!, Oct. 8, 2008, search date Sep. 4, 2018, internet<URL: https://www.gizmodo.jp/2008/10/carcadear.html>.
Gizmodo, AR world (video clip) of "Carcade" in which the scenery of the car window becomes arcade game, Oct. 10, 2008, search date Sep. 4, 2018, internet<URL: https://www.gizmodo.jp/2008/10/carcadear.html>.

* cited by examiner

FIG. 1
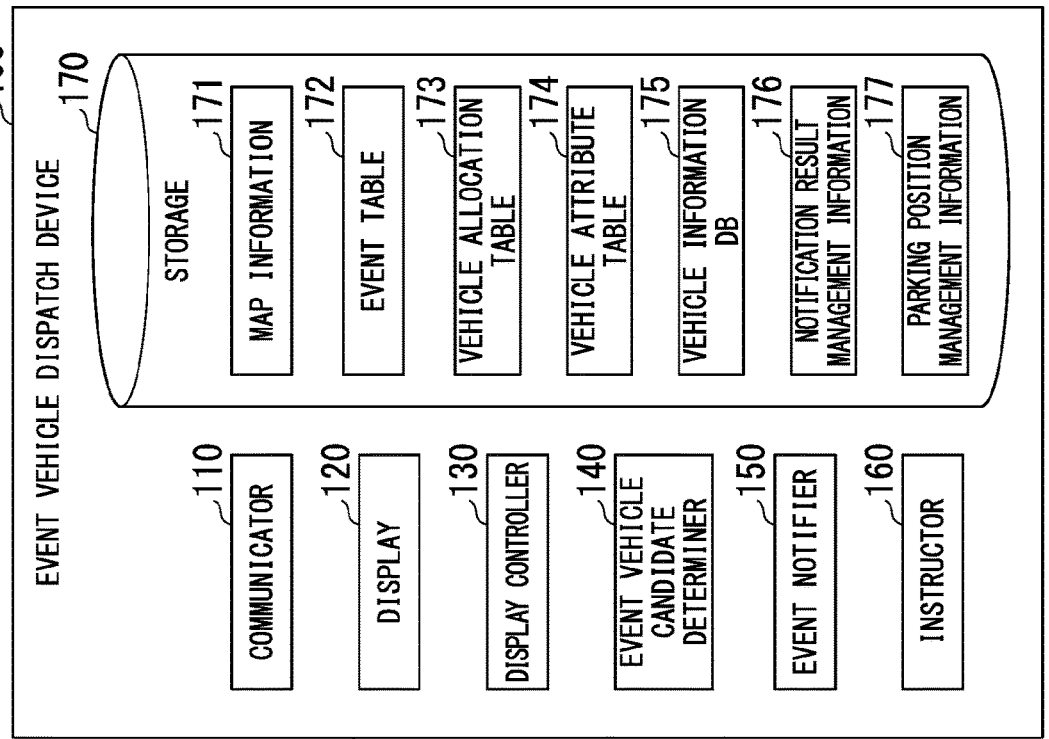
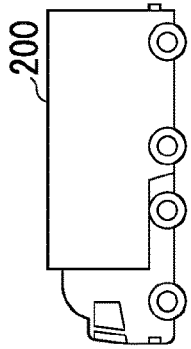
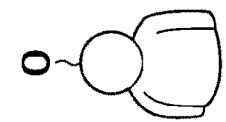

| EVENT ID | EVENT CONTENT |
|---|---|
| I001 | MUSIC FESTIVAL |
| I002 | FOOD FESTIVAL |
| I003 | CHERRY BLOSSOM VIEWING |
| I004 | SEA BATHING |
| I005 | AUTUMN TINT |
| I005 | SKIING |
| ... | ... |

| AREA ID | EVENT ID | VEHICLE ATTRIBUTE ID | NUMBER OF VEHICLES |
|---------|----------|----------------------|---------------------|
| A001 | I001 | T004 | 20 |
| | I002 | T001 | 10 |
| | | T002 | 10 |
| | ... | ... | ... |
| ... | ... | ... | ... |

| VEHICLE ATTRIBUTE ID | ATTRIBUTE CONTENT |
|----------------------|-------------------|
| T001 | FOOD (CURRY) |
| T002 | FOOD (RAMEN NOODLES) |
| T003 | CONVENIENCE STORE |
| T004 | LODGING |
| T111 | ELECTRICITY OR FUEL |
| ... | ... |

175

| VEHICLE ATTRIBUTE ID | VEHICLE ID | VEHICLE COMMUNICATION ADDRESS | OWNER ADDRESS | POSITIONAL INFORMATION |
|---|---|---|---|---|
| T001 | C001 | *** | *** | (***, ***) |
| | C002 | *** | *** | (***, ***) |
| | C003 | *** | *** | (***, ***) |
| | ... | ... | ... | (***, ***) |
| T002 | C011 | *** | *** | (***, ***) |
| ... | ... | ... | ... | ... |

| VEHICLE ID | NOTIFICATION FLAG | PARTICIPATION FLAG |
|---|---|---|
| C001 | 1 | 1 |
| C002 | 1 | 0 |
| C003 | 1 | 1 |
| C004 | 0 | 0 |
| ... | ... | ... |

| VEHICLE ID | PARKING POSITION |
|---|---|
| C001 | X1 |
| C003 | X2 |
| C202 | Y1 |
| C204 | X3 |
| ... | ... |

| USER ID | USER ADDRESS | VEHICLE DISPATCH FLAG | VEHICLE ID | PICK-UP PLACE ARRIVAL DATE | PICK-UP PLACE |
|---------|--------------|----------------------|------------|---------------------------|---------------|
| U001 | **** | 1 | C001 | 2017/7/15 10:30 | EAST ENTRANCE OF OO STATION |
| U002 | **** | 0 | | | |
| U003 | **** | | | | |
| U004 | **** | 1 | C001 | 2017/7/15 10:40 | FRONT OF △△ HOTEL |
| U005 | **** | 1 | C002 | 2017/7/16 13:30 | NORTH ENTRANCE OF OO STATION |
| ... | ... | ... | ... | ... | ... |

EVENT VEHICLE DISPATCH DEVICE, EVENT VEHICLE DISPATCH METHOD, PROGRAM, AND MANAGEMENT SYSTEM

TECHNICAL FIELD

The present invention relates to an event vehicle dispatch device, an event vehicle dispatch method, a program, and a management system.

Priority is claimed on Japanese Patent Application No. 2017-118745, filed Jun. 16, 2017, the content of which is incorporated herein by reference.

BACKGROUND ART

In the related art, there is a technology for causing at least two vehicles to have and share at least two functions selected from a function group of kitchen, fuel gas supply, power supply, lodging rooms, and the like, setting the vehicles as function sharing vehicles, and combining the function sharing vehicles at a construction site after traveling to build a facility (for example, see Patent Literature 1).

CITATION LIST

Patent Literature

[Patent Literature 1]
Japanese Unexamined Patent Application, First Publication No. 2003-63301

SUMMARY OF INVENTION

Technical Problem

However, in the technologies of the related art, since services which can be provided for each vehicle are not centrally managed, efficient collection of vehicles in accordance with events cannot be realized in accordance with temporarily held events.

The present invention is devised in view of such circumstances and an objective of the present invention is to provide an event vehicle dispatch device, an event vehicle dispatch method, a program, and a management system capable of efficiently collecting vehicles in accordance with events and capable of causing a plurality of vehicles to provide services.

Solution to Problem

An event vehicle dispatch device, an event vehicle dispatch method, a program, and a management system according to the present invention adopt the following configurations.

(1) According to an aspect of the present invention, an event vehicle dispatch device (100, 100A) includes: an event notifier (150) configured to notify a plurality of vehicles (200) or owners of the vehicles of an event held in an area in which the plurality of vehicles are able to park; and an adjuster (140, 150) configured to adjust the number of vehicles corresponding to vehicle attributes of vehicles arriving at the area based on the vehicle attribute of each of the plurality of vehicles.

(2) The event vehicle dispatch device according to the aspect (1) may further include an instructor (160) configured to instruct the plurality of vehicles of parking positions of the plurality of vehicles so that the plurality of vehicles arriving at the area are located at predetermined positions inside the area.

(3) In the event vehicle dispatch device according to the aspect (1) or (2), the event notifier may notify a vehicle or an owner of the vehicle within a predetermined distance from a position of the area of the event.

(4) In the event vehicle dispatch device according to any one of the aspects (1) to (3), the event notifier may notify the number of vehicles that are able to park in the area of the event.

(5) In the event vehicle dispatch device according to any one of the aspects (1) to (4), the vehicle may be an automated driving vehicle.

(6) In the event vehicle dispatch device according to the aspect (5), the automated driving vehicle may include a towing vehicle that tows a trailer.

(7) In the event vehicle dispatch device according to any one of the aspects (1) to (6), the event notifier may notify of information regarding an event held in the area of a user registered in advance and acquires from the user information regarding whether the user desires pick-up in the area.

(8) The event vehicle dispatch device according to any one of the aspects (1) to (7) may further include a pick-up manager (180) configured to cause a vehicle participating in the event to pick up a user of the event between a predetermined place and the area.

(9) According to another aspect of the present invention, an event vehicle dispatch method causes a computer to: notify a plurality of vehicles or owners of the vehicles of an event held in an area in which the plurality of vehicles are able to park; and adjust the number of vehicles corresponding to vehicle attributes of vehicles arriving at the area based on the vehicle attribute of each of the plurality of vehicles.

(10) According to still another aspect of the present invention, a program causes a computer to: notify a plurality of vehicles or owners of the vehicles of an event held in an area in which the plurality of vehicles are able to park; and adjust the number of vehicles corresponding to vehicle attributes of vehicles arriving at the area based on the vehicle attribute of each of the plurality of vehicles.

(11) According to still another aspect of the present invention, a management system includes: a specifier (182) configured to specify an area in which a plurality of vehicles are able to park; and an area manager (186) configured to notify of area information acquired by the specifier and acquire arrival information of the vehicles arriving at the area based on attribute information of the plurality of vehicles.

(12) The management system according to the aspect (11) may further include an instructor (160) configured to instruct the vehicles of parking positions so that the vehicles arriving at the area are located at predetermined positions inside the area.

(13) The management system according to the aspect (11) may further include a notifier configured to notify a vehicle or an owner of the vehicle within a predetermined distance from a position of the area of the area information.

(14) In the management system according to the aspect (11), the vehicles may include an automated driving vehicle. The area manager may include a route setter configured to cause the vehicle to arrive as an unmanned vehicle at the area, and a route setting requester configured to notify a vehicle other than the automated driving vehicle of route information to the area.

(15) The management system according to the aspect (11) may further include a pick-up manager configured to issue route information in which a representative place of the area is a transit place when the plurality of vehicles are located in the area.

(16) In the management system according to the aspect (13), the notifier may notify of dynamic relevant information acquired from the vehicle or a supervisor of the vehicle which is in the area.

Advantageous Effects of Invention

According to the foregoing aspects (1) to (16), it is possible to efficiently collect vehicles in accordance with events and cause a plurality of vehicles to provide services.

BRIEF DESCRIPTION OF DRAWINGS

FIG. 1 is a diagram showing a configuration of an event vehicle dispatch system according to a first embodiment.

FIG. 6 is a diagram showing an example of content of a vehicle allocation table.

FIG. 7 is a diagram showing an example of content of a vehicle attribute table.

FIG. 10 is a diagram showing an example of content of notification result management information.

FIG. 15 is a diagram showing an example of content of parking position management information.

FIG. 20 is a diagram showing an example of content of user management information.

DESCRIPTION OF EMBODIMENTS

Figure 2:
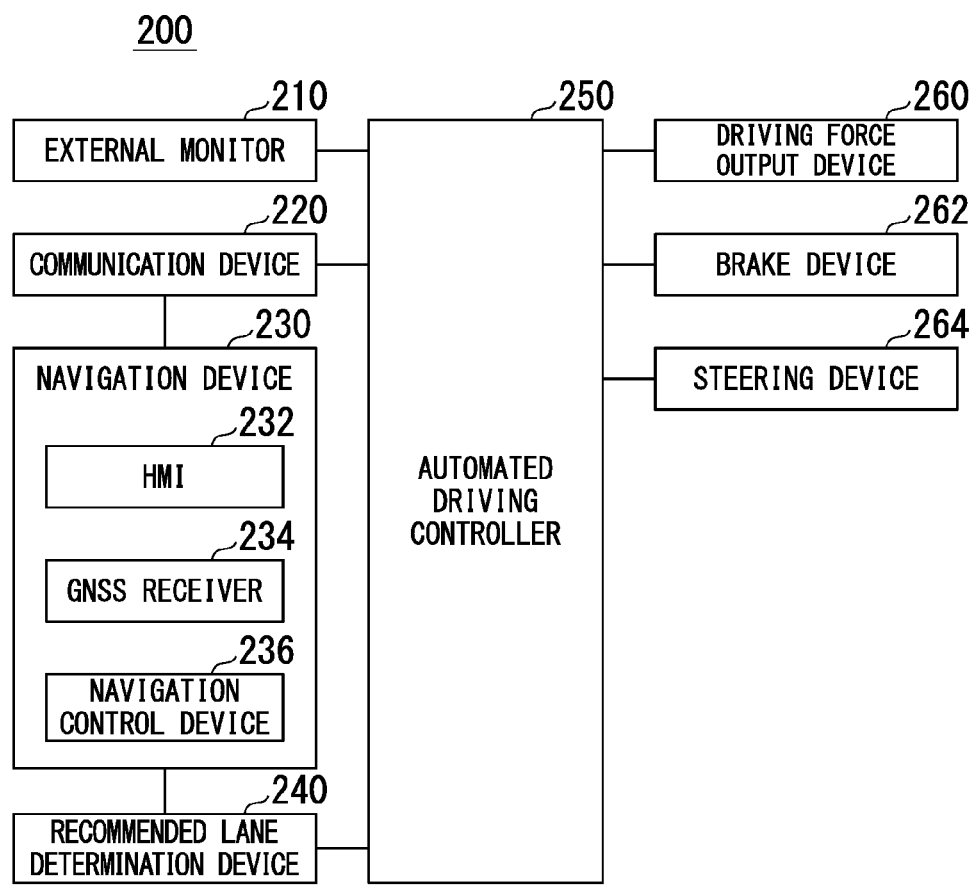
FIG. 2 is a diagram showing a configuration of a vehicle according to the first embodiment.

Hereinafter, mbodiments of an event vehicle dispatch device, an event vehicle dispatch method, a program, and a management system of the present invention will be described with reference to the drawings. hi the following description, a vehicle used for the event vehicle dispatch system including the event vehicle dispatch device is assumed to be an automated driving vehicle. The automated driving vehicle is a vehicle that automatically controls at least one of an accelerated or decelerated speed and steering of the vehicle and can travel. An occupant may perform manual driving of the automated driving vehicle. The automated driving vehicle includes a vehicle that can perform unmanned traveling. A vehicle used for the event dispatch system may be a manual driving vehicle. The event dispatch system is an example of a "management system."

First Embodiment

FIG. 1 is a diagram showing a configuration of an event vehicle dispatch system 1 according to a first embodiment. The event vehicle dispatch system 1 includes an event vehicle dispatch device 100, one or more vehicles 200 and a terminal device 300 used by an owner O of the one or more vehicles 200. These constituent elements can communicate with one another via a network NW. The network NW includes the Internet, a wide area network (WAN), a local area network (LAN), a public communication line, a provider device, a dedicated line, and a wireless base station.

[Event Vehicle Dispatch Device]

The event vehicle dispatch device 100 includes, for example, a communicator 110, a display 120, a display controller 130, an event vehicle candidate determiner 140, an event notifier 150, an instructor 160, and a storage 170. The display controller 130, the event vehicle candidate determiner 140, the event notifier 150, and the instructor 160 are realized, for example, by causing a processor such as a central processing unit (CPU) to execute a program (software) stored in the storage 170. Some or all of the function units may be realized by hardware (a circuit including circuitry) such as a large scale integration (LSI), an application specific integrated circuit (ASIC), a field-programmable gate array (FPGA), or a graphics processing unit (GPU), or may be realized by software and hardware in cooperation. The program may be stored in advance in the storage 170 such as a hard disk drive (HDD) or a flash memory or may be stored in a storage medium detachably mounted on a DVD, a CD-ROM, or the like so that the storage medium is mounted on a drive device (not shown) and is installed on the storage 170. A combination of some or all of the event vehicle candidate determiner 140 and the event notifier 150 is an example of an "adjuster." The event notifier 150 is an example of a "notifier."

The communicator 110 is, for example, a network card for connection to the network NW. The communicator 110 communicates with the vehicle 200, the terminal device 300, and another external device via the network NW.

The display 120 is a display device such as a liquid crystal display (LCD) or an organic electro-luminescence (EL) display device, or the like. The display 120 displays, for example, various kinds of information regarding vehicle dispatch for a supervisor or the like of the event vehicle dispatch device 100 under the control of the display controller 130. The display 120 may have a function of a so-called touch panel receiver that receives an input of information or a confirmation operation when a display screen is touched with a finger tip.

The display controller 130 performs control such that various kinds of information regarding event vehicle dispatch are displayed on the display 120. The display controller 130 acquires an input of information or information regarding a confirmation operation from a supervisor or the like received from the display screen of the display 120. For example, the display controller 130 receives information regarding an event to be held, information regarding an area where the event is held, and the like from the supervisor or the like. The event includes various events like a large-scale or medium-scale event such as a music festival or a food festival in which a period is fixed, a seasonal affair such as a first Shinto shrine visit, cherry blossom viewing, sea bathing, or skiing, a sports event such as Olympic, an exhibition, and festivals performed by a local public organization, a local business company, and the like. The area is, for example, an area in which a plurality of vehicles can be parked. The details of a function of the display controller 130 will be described later.

The event vehicle dispatch candidate determiner 140 receives information regarding a held event received by the display controller 130 and information regarding the area in which the event is held and determines vehicle attributes of vehicles allowed to participate in the event and the number of vehicles for each vehicle attribute with reference to the vehicle allocation table 173 stored in the storage 170. The details of a function of the event vehicle candidate determiner 140 will be described later.

The event notifier 150 notifies candidates for the vehicle 200 determined by the event vehicle candidate determiner 140 of information regarding an event to be held for one or both of the terminal devices 300 and inquiry information for inquiring whether to participate as a service provider in the event among the vehicles 200 or the owners O of the vehicles. The owner O may be a service supervisor who manages provision of a service by the vehicle 200 or may be an occupant of the vehicle 200. The event notifier 150 acquires response information to the inquiry information. The details of a function of the event notifier 150 will be described below.

When the vehicle 200 providing a service in the event travels in the vicinity of the area of an event site, the instructor 160 allocates a parking position inside the area and instructs the vehicle 200 or the owner O of the vehicle 200 of information regarding the allocated position. The vicinity of the area is, for example, a distance from the event site corresponding to an area ID to the vehicle 200 which is within a predetermined distance (for example, within 100 m). The details of a function of the instructor 160 will be described later.

The storage 170 is realized as an HDD, a flash memory, a random access memory (RAM), a read-only memory (ROM), or the like. The storage 170 stores, for example, map information 171, an event table 172, a vehicle allocation table 173, a vehicle attribute table 174, a vehicle information DB 175, notification result management information 176, parking position management information 177, and other information.

[Vehicle]

The vehicle 200 is, for example, a vehicle that has the number of wheels equal to or greater than four, but may be another vehicle other than a motorcycle. For example, the vehicle 200 may be a towing vehicle that tows a detachable cargo stand or the like or may be a vehicle integrated with a cargo stand. FIG. 2 is a diagram showing a configuration of the vehicle 200 according to the first embodiment. The vehicle 200 includes, for example, an external monitor 210, a communication device 220, a navigation device 230, a recommended lane determination device 240, an automated driving controller 250, a driving power output device 260, a brake device 262, and a steering device 264. The automated driving controller 250 includes, for example, a processor such as a CPU that executes a program (software) stored in a storage (not shown) in the vehicle 200.

The external monitor 210 includes, for example, a camera or a radar, a light detection and ranging (LIDAR) device, and an object recognition device that performs a sensor fusion process based on such an output. The external monitor 210 estimates kinds of objects (in particular, vehicles pedestrians, and bicycles) near the vehicle 200 and outputs the kinds of objects to the automated driving controller 250 along with information regarding positions or speeds of objects.

The communication device 220 is, for example, a wireless communication module that is connected to the network NW or directly communicates with the event vehicle dispatch device 100 or another external device. The communication device 220 performs wireless communication in conformity with Wi-Fi, dedicated short range communications (DSRC), Bluetooth (registered trademark), or another communication standard. As the communication device 220, a plurality of communication devices may be prepared in accordance with purpose.

The navigation device 230 includes, for example, a human machine interface (HMI) 232, a global navigation satellite system (GNSS) receiver 234, and a navigation control device 236.

The HMI 232 includes, for example, a touch panel display device, a speaker, and a microphone. The HMI 232 outputs an image or a sound or receives operation content from an occupant. For example, the HMI 232 outputs information for displaying a route to a destination on a screen or prompting an occupant to perform an operation on the vehicle 200 on the screen or outputs the information as a sound. The HMI 232 causes event notification information and inquiry information from the event vehicle dispatch device 100 to be displayed on the screen or to be notified of as a sound. The HMI 232 receives response information to the inquiry information operated by the occupant and transmits the received response information to the event vehicle dispatch device 100.

The GNSS receiver 234 positions an own position (the position of the vehicle 200) based on radio waves arriving from GNSS satellites (for example, GPS satellites). The navigation control device 236 includes, for example, a CPU and various storage devices and control of the entire navigation device 230. A storage device stores map information (a navigation map). The navigation map is a map in which roads are indicated using nodes and links.

The navigation control device 236 may spontaneously determine a route from the position of the vehicle 200 positioned by the GNSS receiver 234 to a destination designated using the HMI 232 with reference to the navigation map. The navigation control device 236 outputs information regarding the route determined in any of the foregoing methods and outputs the information to the recommended lane determination device 240. The navigation control device 236 may transmit the position of the vehicle 200 positioned by the GNSS receiver 234 to the event vehicle dispatch device 100 at a predetermined timing.

The recommended lane determination device 240 includes, for example, a map positioning unit (MPU) and various storage devices. A storage device stores highly accurate map information that is more detailed than that of the navigation map. The highly accurate map information includes, for example, information such as road widths, gradients, curvatures of respective lanes, and traffic signal positions. The recommended lane determination device 240 determines a preferred recommended lane to travel along a route input from the navigation device 230 and outputs the recommended lane to the automated driving controller 250.

The automated driving controller 250 includes one or more processors such as a CPU or a micro processing unit (MPU) and various storage devices. The automated driving controller 250 causes the vehicle 200 to automatically drive so that the vehicle 200 avoids contact with objects of which positions or speeds are input from the external monitor 210 on the principle that the vehicle 200 travels along a recommended lane determined by the recommended lane determination device 240. The automated driving controller 250 performs, for example, various events in sequence. Examples of the events include a constant speed traveling event for traveling at a constant speed in the same travel lane, a following traveling event for following a front traveling vehicle, a lane changing event, a joining event, a branching event, an emergency stopping event, a toll gate event for passing through a toll gate, and a handover event for ending automated driving and switching to manual driving. An action for avoidance is planned based on a surrounding situation (presence of a surrounding vehicle or pedestrian, contraction of a lane due to road construction, or the like) of the vehicle 200 while such an event is being performed in some cases.

The automated driving controller 250 generates a target trajectory along which the vehicle 200 travels in future. The target trajectory includes, for example, a speed component. For example, the target trajectory is expressed by arranging places (trajectory points) at which the own vehicle M arrives in order. The trajectory point is a place at which the own vehicle M arrives for each predetermined traveling distance. Apart from this, a target speed and target acceleration for each predetermined sampling time (for example, about tenths of a second) is generated as a part of the target trajectory. The trajectory point may be a position for each predetermined sampling time at which the own vehicle M arrives at the sampling time. In this case, information regarding the target speed or the target acceleration is expressed at an interval of the trajectory point.

Figure 3:
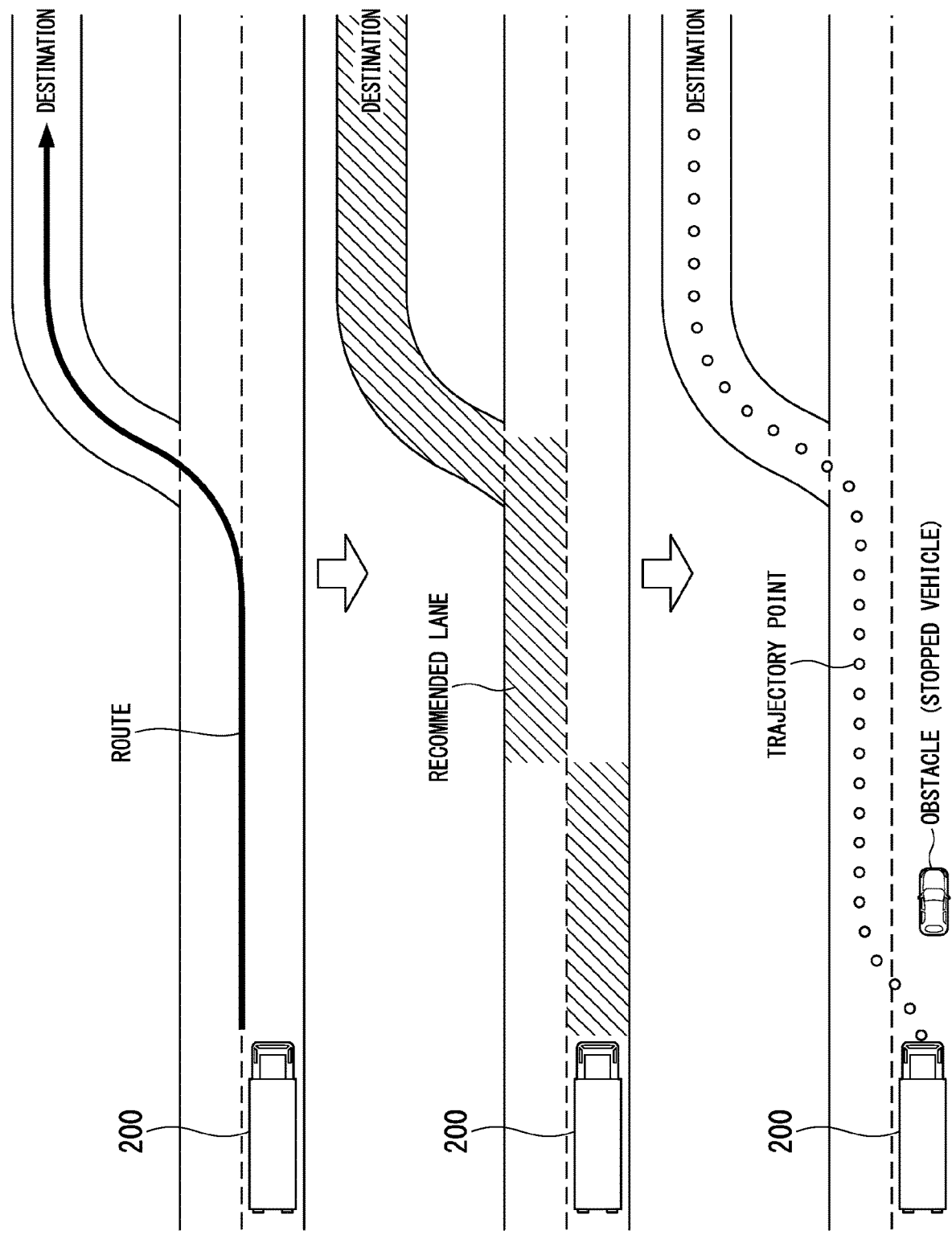
FIG. 3 is a diagram showing a process procedure of automated driving.

FIG. 3 is a diagram showing a process procedure of automated driving. First, as shown in the upper drawing, the navigation device 230 determines a route. This route is, for example, a rough route in which lanes are not distinguished. Subsequently, as shown in the middle drawing, the recommended lane determination device 240 determines a recommended lane in which the vehicle easily travels along a route. As shown in the lower drawing, the automated driving controller 250 generates trajectory points for traveling along the recommended lane if possible, for example, while avoiding obstacles and controls some or all of the travel driving force output device 260, the brake device 262, and the steering device 264 such that the vehicle travels along the trajectory points (and a subordinate speed profile). The role sharing is merely exemplary and, for example, the automated driving controller 250 may perform processes unitarily.

The driving power output device 260 outputs travel driving power (torque) for traveling a vehicle to a driving wheel. The driving power output device 260 includes, for example, a combination of an internal combustion engine, an electric motor and a transmission, and a power electronic control unit (ECU) controlling these units. The power ECU controls the foregoing configuration in accordance with information input from the automated driving controller 250 or information input from a driving operator (not shown).

The brake device 262 includes, for example, a brake caliper, a cylinder that transmits a hydraulic pressure to the brake caliper, an electronic motor that generates a hydraulic pressure in the cylinder, and a brake ECU. The brake ECU controls the electric motor in accordance with information input from the automated driving controller 250 or information input from the driving operator such that a brake torque in accordance with a brake operation is output to each wheel. The brake device 262 may include a mechanism that transmits a hydraulic pressure generated in response to an operation of the brake pedal included in the driving operator to the cylinder via a master cylinder as a backup. The brake device 262 is not limited to the above-described configuration and may be an electronic control type hydraulic brake device that controls an actuator in accordance with information input from the automated driving controller 250 such that a hydraulic pressure of the master cylinder is transmitted to the cylinder.

The steering device 264 includes, for example, a steering ECU and an electric motor. The electric motor applies a force to, for example, a rack and pinion mechanism to change a direction of a steering wheel. The steering ECU drives the electric motor to change the direction of the steering wheel in accordance with information input from the automated driving controller 250 or information input from the driving operator.

[Terminal Device]

Referring back to FIG. 1, the terminal device 300 is, for example, a smartphone, a tablet terminal, a personal computer, or the like. The terminal device 300 supports a service to be described below, for example, by activating an application program, a browser, or the like for using the event vehicle dispatch system. In the following description, it is assumed that the terminal device 300 is a smartphone and an application program (an event vehicle dispatch application) is activated.

The terminal device 300 includes, for example, a communicator 310, an information acquirer 320, and a display 330. The communicator 310 is, for example, a network card connected to the network NW. The communicator 310 communicates with the event vehicle dispatch device 100 or other external devices via the network NW.

The information acquirer 320 is realized, for example, when a processor such as a CPU executes a program (software) stored in a storage (not shown). The information acquirer 320 may be realized by hardware (a circuit including circuitry) such as an LSI, an ASIC, or an FPGA, or a GPU or may be realized by software and hardware in cooperation. The program may be stored in advance in a storage or may be stored in detachable storage medium such as a DVD or a CD-ROM so that the storage medium is installed in a drive device and is installed in the storage. The information acquirer 320 acquires, for example, inquiry information and information regarding the event, or the like from the event vehicle dispatch device 100. The information acquirer 320 is, for example, a function that is realized by activating the event vehicle dispatch application installed in the terminal device 300. The information acquirer 320 may have a function of acquiring an electronic mail transmitted from the event vehicle dispatch device 100 or transmitting a mail by mail software installed in the terminal device 300.

The display 330 is an LCD, an organic EL display device, or the like. The display 330 displays the inquiry information and the information regarding the event acquired by the information acquirer 320. The display 330 may have a function of a so-called touch panel receptor that receives information operated by the owner O with regard to the displayed content. The operated information is, for example, response information corresponding to the inquiry information. The display 330 causes the communicator 310 to transmit the received response information to the event vehicle dispatch device 100.

[Specific Process Content in Event Vehicle Dispatch System 1 According to First Embodiment]

Hereinafter, specific process content in the event vehicle dispatch system 1 according to the first embodiment will be described. The event vehicle dispatch device 100 causes the display 120 to display an event vehicle dispatch setting screen IM1 when an instruction to perform an event vehicle dispatch process according to the first embodiment is received from the supervisor.

Figures 4, 5:
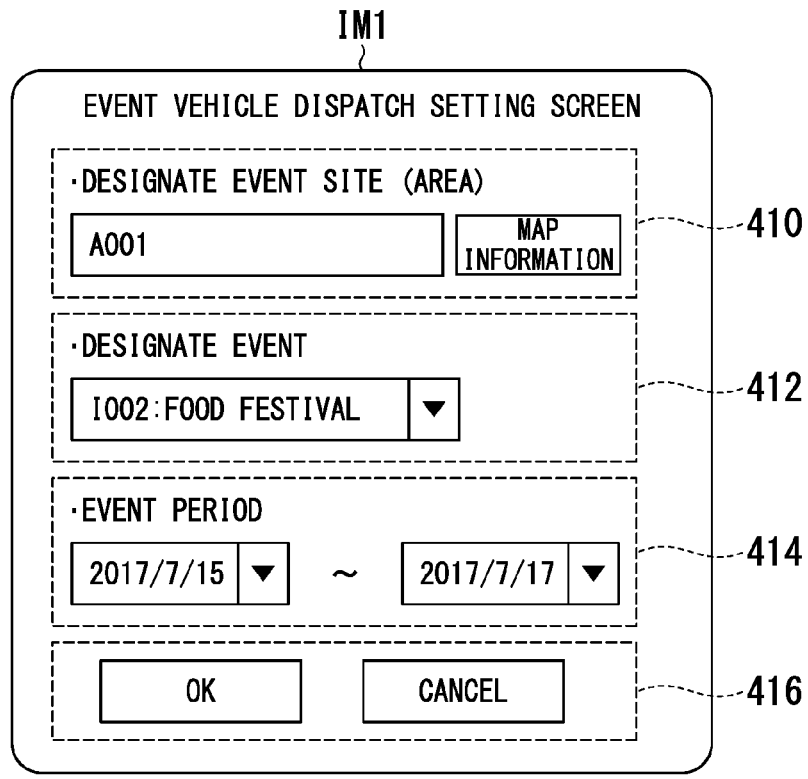
FIG. 4 is a diagram showing an example of an event vehicle dispatch setting screen.
FIG. 5 is a diagram showing an example of content of an event table.

FIG. 4 is a diagram showing an example of the event vehicle dispatch setting screen IM1. On the event vehicle dispatch setting screen IM1, an event site destination region 410 in which a held event site (area) is designated, an event destination region 412 in which an event is designated, an event period designation region 414 in which an event period is designated, and a confirmation operation region 416 in which execution or cancellation of vehicle dispatch based on input content is confirmed are shown. Display items of a layout of the event vehicle dispatch setting screen IM1 are not limited to the example of FIG. 4. A layout or items of another screen IMx (where x is a natural number equal to or greater than 2) to be described below may be arbitrarily changed.

The display controller 130 receives information regarding an event site which is input to the event site destination region 410 through an operation input of the supervisor. The display controller 130 displays a map information button in the event site destination region 410. When the supervisor selects the map information button, map information included in the map information 171 stored in the storage 170 is displayed on the display 120. Here, the map information 171 includes, for example, road information regarding roads expressed with nodes and links, traffic regulation information, address information (an address and a postal code), and facility information. The road information includes information indicating kinds of roads such as expressways, toll roads, national ways, or prefecture roads and information such as the number of lanes of a road, an emergency parking area, the width of each lane, the gradients of roads, the positions of roads (3-dimensional coordinates including longitude, latitude, and height), curvatures of curves of lanes, positions of joining and branching points of lanes, and signs installed on roads. The map information 171 may include identification information (an area ID) for identifying a parking area in which the vehicle 200 is parked or information regarding a position or a size for each area ID.

The display controller 130 may cause the display 120 to display the map information and receive a position touched by the supervisor as an input of the event site.

The display controller 130 receives information for specifying an event input in the event destination region 412 through an operation input of the supervisor. The display controller 130 displays, for example, a list box including a plurality of events set in advance in the event destination region 412 and receives information regarding one event selected by the supervisor among the plurality of events. The events displayed in the list box are stored in the event table 172.

FIG. 5 is a diagram showing an example of content of the event table 172. In the event table 172, event content is associated with an event ID for identifying an event. For example, an event "food festival" is associated with event ID "I002."

The display controller 130 receives information for specifying an event period input in the event period designation region 414 in which an event period is designated through an operation input of the supervisor. For example, the display controller 130 selects a start date and an end date of an event from the list box and receives information regarding one date.

The display controller 130 receives an execution of event vehicle dispatch by receiving a selection of an OK button in the confirmation operation region 416 and confirms cancellation of the event vehicle dispatch by receiving a selection of a cancellation button.

The event vehicle candidate determiner 140 adjusts vehicle attributes of the vehicles 200 allowed to participate in the event and the number of vehicles for each vehicle attribute with reference to the vehicle allocation table 173 stored in the storage 170 based on information regarding an area in which the event received by the display controller 130 is held and the event, and determines candidates for the vehicles 200 notified of by the event notifier 150.

FIG. 6 is a diagram showing an example of content of the vehicle allocation table 173. In the vehicle allocation table 173, a vehicle attribute ID and the number of vehicles for each vehicle are associated with the area ID and the event ID. The area ID is identification information for identifying an area. The vehicle attribute ID is identification information for identifying an attribute of the vehicle 200 participating in the event. The attribute of the vehicle is, for example, an attribute indicating a genre of a service and specific content of the service provided by the vehicle 200 or a cargo stand of the vehicle 200. The content of the attribute may be stored as a vehicle attribute table 174 in the storage 170.

FIG. 7 is a diagram showing an example of content of the vehicle attribute table 174. In the vehicle attribute table 174, attribute content is associated with the vehicle attribute ID. Examples of the attribute content include a food stand vehicle in which predetermined food such as curry or ramen noodles is cooked, a convenience store vehicle in which many kinds of items such as food and daily necessities are sold, and a lodging vehicle in which a user is allowed to lodge. As the attribute content, there is an electricity or fuel vehicle in which batteries or fuels are supplied to a plurality of vehicles participating in an event.

Referring back to FIG. 6, the number of vehicles in the vehicle allocation table 173 is the number of vehicles which can be parked in an area of an area ID. For example, the example of FIG. 7 shows that twenty vehicles of vehicle ID "T004" can be allocated when an event of event ID "I001" is held in an area of area ID "A001." When another event (event ID "I002") is held in the same area of area ID "A001," ten vehicles of vehicle ID "T001" and vehicles of vehicle ID "T002" can be allocated. The event vehicle candidate determiner 140 may receive an instruction or the like for the supervisor or the like to generate, change, or delete various kinds of information of the vehicle allocation table 173 and may adjust the vehicle attribute of the area or the event, the number of vehicles, or the like based on the received instruction.

The event vehicle candidate determiner 140 outputs information regarding the determined vehicle attribute and number of vehicles of the vehicle dispatch to the display controller 130 with reference to the vehicle allocation table 173 and the vehicle attribute table 174. The display controller 130 displays the information regarding the vehicle attribute of the vehicle dispatch and the number of vehicles determined by the event vehicle candidate determiner 140 on the display 120.

Figures 8, 9:
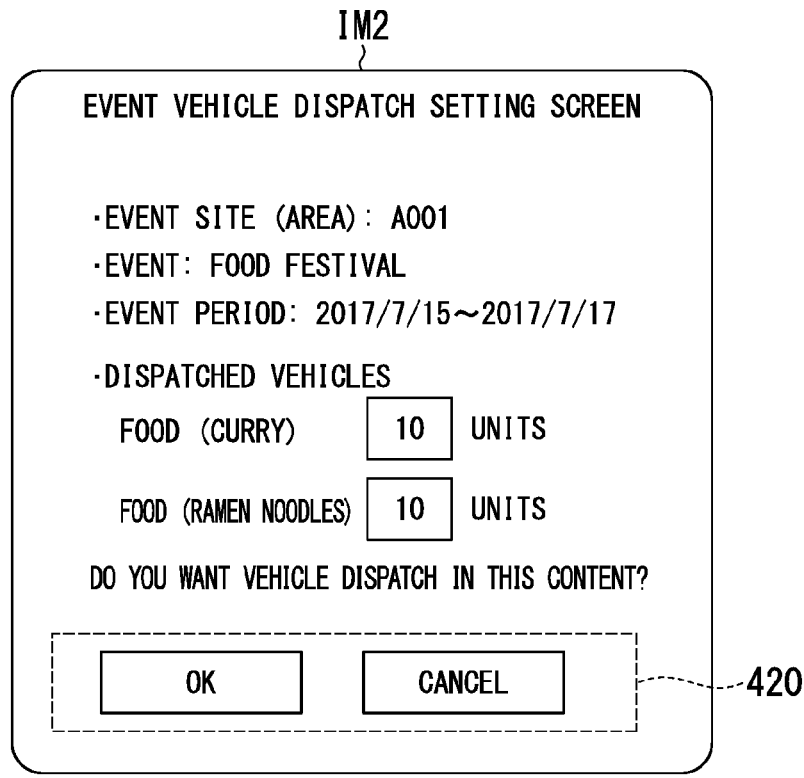
FIG. 8 is a diagram showing an example of an event vehicle dispatch setting screen displayed on a display after event vehicle dispatch is performed.
FIG. 9 is a diagram showing an example of content of vehicle information DB.

FIG. 8 is a diagram showing an example of an event vehicle dispatch setting screen IM2 displayed on the display 120 after event vehicle dispatch is performed. In the event vehicle dispatch setting screen IM2, kinds of vehicles scheduled to be dispatched and the number of each kind of vehicle are displayed. In the number of vehicles, kinds of vehicles allocated in the vehicle allocation table 173 and the number of vehicles are displayed. The display controller 130 can display the number of dispatched vehicles so that the number of dispatched vehicles can be changed by the supervisor and can arbitrarily change and adjust the number of vehicles through an input of the supervisor. The display controller 130 may update the number of vehicles in the vehicle allocation table 173 based on the number of vehicles adjusted through the operation input by the supervisor.

On the event vehicle dispatch setting screen IM2, a confirmation operation region 420 is shown. When a selection of an OK button is received in the confirmation operation region 420, the display controller 130 receives an execution of event vehicle dispatch. When a selection of a cancellation button is received, the display controller 130 confirms cancellation of the event vehicle dispatch.

When an execution of the event vehicle dispatch is received on the event vehicle dispatch setting screen IM2, the event vehicle candidate determiner 140 determines the vehicles 200 which are candidates participating in the event based on the set kinds of vehicles and number of vehicles with reference to the vehicle information DB 175 stored in the storage 170. For example, the event vehicle candidate determiner 140 acquires the vehicle IDs corresponding to the vehicle attribute ID by the number of vehicles set in the vehicle allocation table 173 with reference to the vehicle information DB 175.

FIG. 9 is a diagram showing an example of content of the vehicle information DB 175. In the vehicle information DB 175, a vehicle ID which is identification information for identifying the vehicle 200, a vehicle communication address for communicating with the vehicle 200, an owner address for communicating with the terminal device 300 of the owner of the vehicle 200, and positional information of the vehicle are associated with the vehicle attribute ID. The vehicle communication address is an IP address for communicating with the communication device of the vehicle 200 or a mail address, a telephone number, or the like allocated to the vehicle 200. The owner address is an IP address for communicating with the terminal device 300 or a mail address, a telephone number, or the like allocated to the terminal device 300. The positional information is information (for example, latitude and longitude) for specifying a position of the vehicle 200 transmitted at a predetermined timing from each vehicle 200.

The event notifier 150 acquires an address of one or both of the terminal devices 300 between the vehicle 200 and the owner O of the vehicle with regard to the candidates for the vehicles 200 determined by the event vehicle candidate determiner 140 and notifies of the acquired address of the inquiry information and the information regarding the held event. The event notifier 150 may notify of the address by an electronic mail, may notify of the address by making a phone call to the telephone number with a mechanic voice, or may notify of the address via an application program installed in the vehicle 200 or the terminal device 300.

The event notifier 150 updates the notification result management information 176 stored in the storage 170 based on a response result indicating whether to participate acquired from the target vehicle 200 or the terminal device 300.

FIG. 10 is a diagram showing an example of content of the notification result management information 176. In the notification result management information 176, a notification flag and a participation flag are associated with the vehicle ID that is notified of. The notification flag is a flag for identifying whether to notify the vehicle 200 corresponding to the vehicle ID or the terminal device 300 of the owner O of the vehicle 200 of the inquiry information and the information regarding the event by the event notifier 150. In the example of FIG. 10, the event notifier 150 sets "1" in the notification flag when the information is notified of. The event notifier 150 sets "0" when the information is not notified of. However, the identification information of the flag is not limited thereto. The same applies to other flags to be described below.

The participation flag is a flag for identifying whether a vehicle of a vehicle ID participates in an event that is notified of. The participation flag is set by the event notifier 150 based on an inquiry result corresponding to the inquiry information that is notified of. In the example of FIG. 10, "1" is set in the participation flag in the case of participation in the event as a service provider, and "0" is set in the participation flag in the case of no participation in the event as a service provider or the case of no response to the inquiry information.

Figure 11:
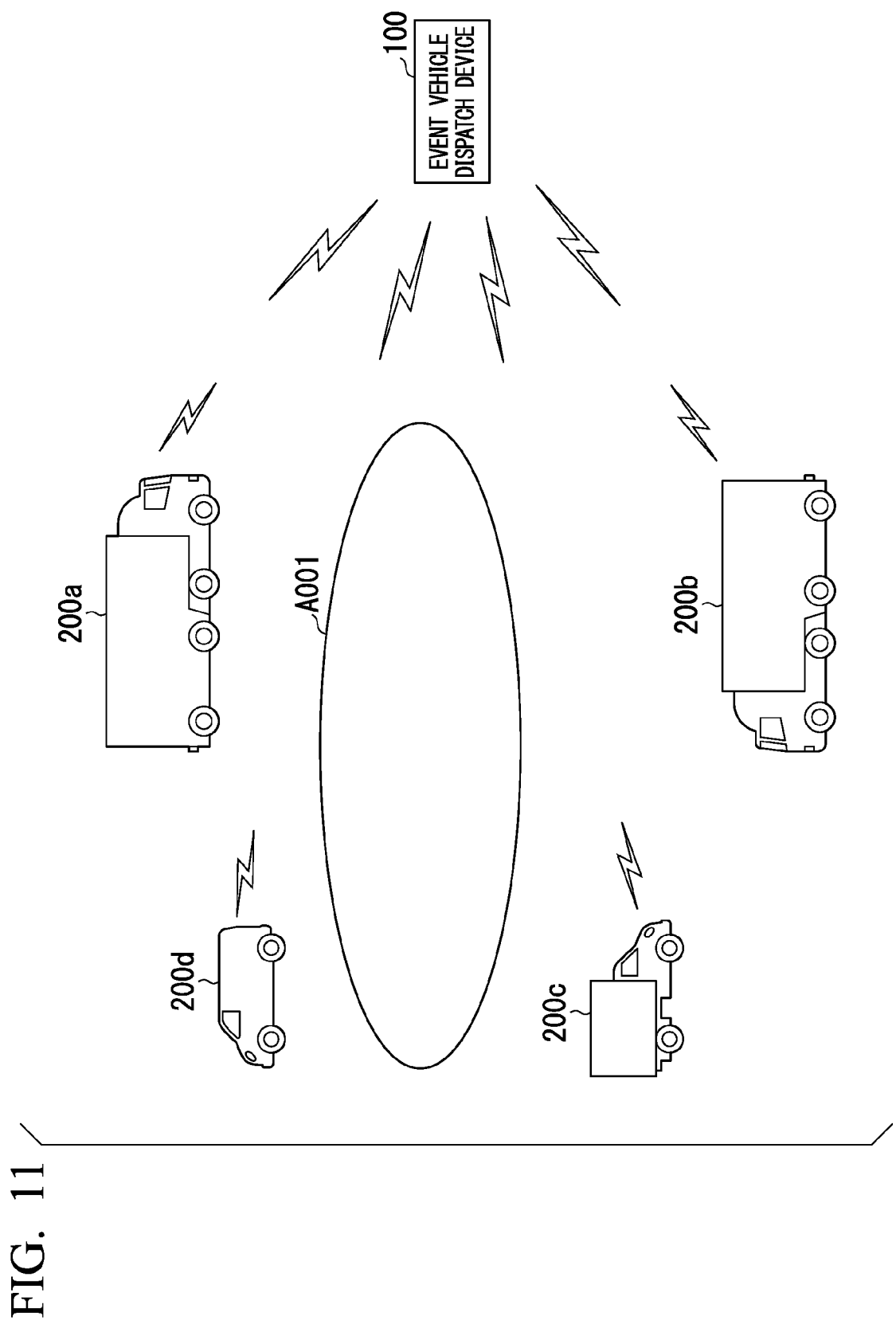
FIG. 11 is a diagram showing event notification to a vehicle.

FIG. 11 is a diagram showing event notification to the vehicle 200. In the example of FIG. 11, for example, the event notifier 150 notifies the number of vehicles set in a vehicle order (for example, a vehicle ID order) registered in the vehicle information DB 175 of the inquiry information and the information regarding the event for each vehicle attribute.

The event notifier 150 may notify the set number of vehicles of the inquiry information and the information regarding the event information for the vehicles which have the vehicle attribute IDs that are set as participants in the event and in order of proximity from an area in which the event is held among the vehicles registered in the vehicle information DB 175. In the example of FIG. 11, four vehicles 200a to 200d are notified in order proximity from area "A001" in which an event is held. By notifying the vehicles closer to the area in which the event is held of the event first, it is possible to gather the vehicles 200 at the event site quickly.

Figure 12:
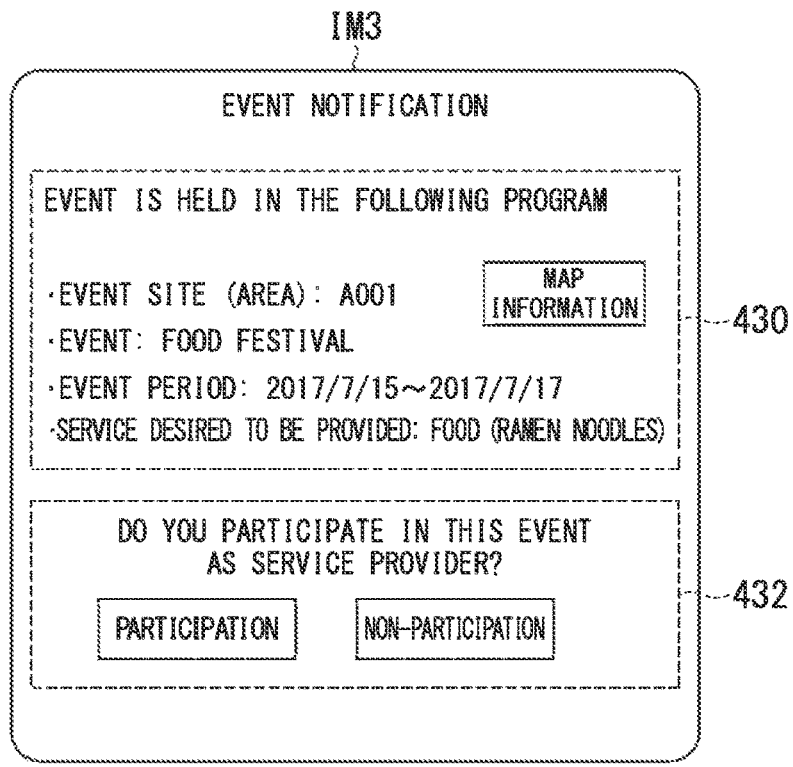
FIG. 12 is a diagram showing an example of an event notification screen displayed on an HMI of the vehicle.

FIG. 12 is a diagram showing an example of an event notification screen IM3 displayed on the HMI 232 of the vehicle 200. The screen shown in FIG. 12 and a screen shown in FIG. 13 to be described below may be displayed on the terminal device 300. On the event notification screen IM3, for example, an event notification region 430 in which the information regarding the event notified of by the event vehicle dispatch device 100 is displayed and an inquiry confirmation region 432 in which whether to participate in the event as a service provider is inquired of. In the event notification region 430, for example, an event site, event content, an event period, and service content desired to be provided are shown. In the inquiry confirmation region 432, a button for confirming whether to participate in the event is displayed. When a selection of the participation button by an occupant of the vehicle 200 is received, the HMI 232 causes the communication device 220 to transmit response information indicating the participation to the event vehicle dispatch device 100. When a selection of a non-participation button is received or the selection of the participation button or the non-participation button is not received despite elapse of a predetermined time or more after the display of the event notification screen IM3, the HMI 232 transmits information indicating the non-participation to the event vehicle dispatch device 100.

Figure 13:
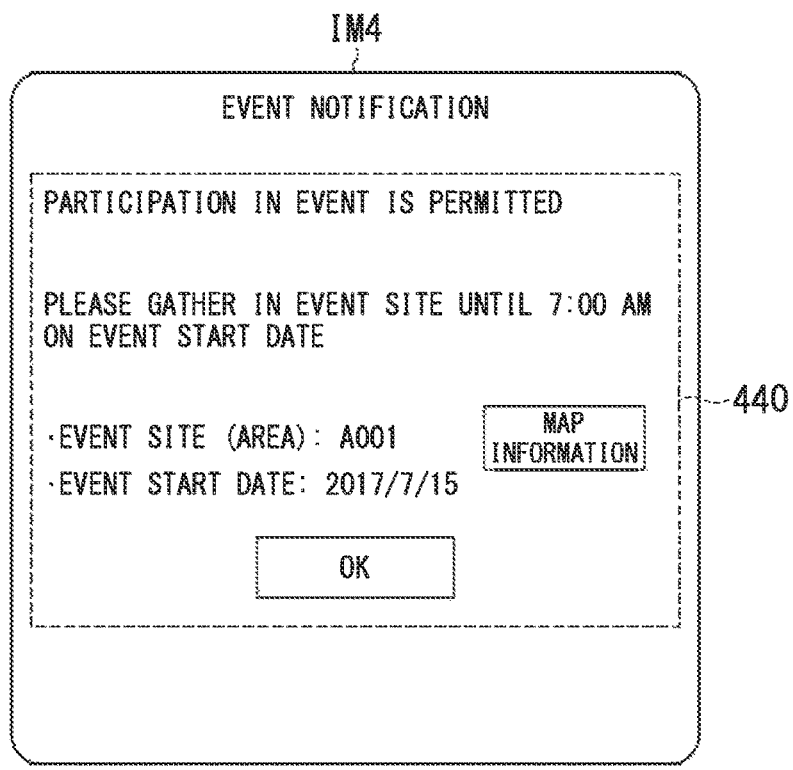
FIG. 13 is a diagram showing an example of an event notification screen transmitted to a vehicle which has responded to an intention to participate.

When information indicating the participation in the event is received from the vehicle 200, the event notifier 150 registers response information from the vehicle 200 in the notification result management information 176 and transmits specific content of the event to the participating vehicle 200. FIG. 13 is a diagram showing an example of an event notification screen IM4 transmitted to the vehicle 200 which has responded with an intention to participate. On the event notification screen IM4, a participation determination notification region 440 is shown. In the participation determination notification region 440, for example, information indicating permission for the participation, information regarding a gathering schedule, information regarding an event site and an event start date, and an OK button are shown. When a selection of the OK button is received, the HMI 232 closes the event notification screen IM4.

When information indicating non-participation in the event is received from the vehicle, the event notifier 150 registers the response information from the vehicles 200 in the notification result management information 176. Further, the event notifier 150 may select a vehicle from the vehicle information DB 175 in place of the vehicle which does not participate in the event and notify the selected vehicle of the inquiry information and the information regarding the event. Thus, the notification can be performed until the number of vehicles participating in the event becomes a scheduled number, and thus it is possible to ensure the scheduled number of event vehicles.

The event notifier 150 may notify the vehicles 200 of a request for gathering at the event or a demand prospect when the vehicles 200 perform automated driving. In this case, when the notification of the request for gathering at the event or the demand prospect is received, the vehicles 200 perform the automated driving by the automated driving controller 250 and move to the area in which the event is held despite not knowing the content of the event. Thus, the number of vehicles necessary for the event can gather in the area. The vehicles 200 may notify the event vehicle dispatch device 100 of an area arrival time by the automated driving.

When the vehicles 200 participating in the event perform the automated driving by the automated driving controller 250 and arrive at the vicinity of the event site at a time close to the gathering time, the instructor 160 notifies the vehicles 200 (or the terminal devices 300) of information regarding vehicle parking position. The time close to the gathering time is a range such as several hours before or after the gathering time (for example, 3 hours before or after the gathering time) or the like.

Figure 14:
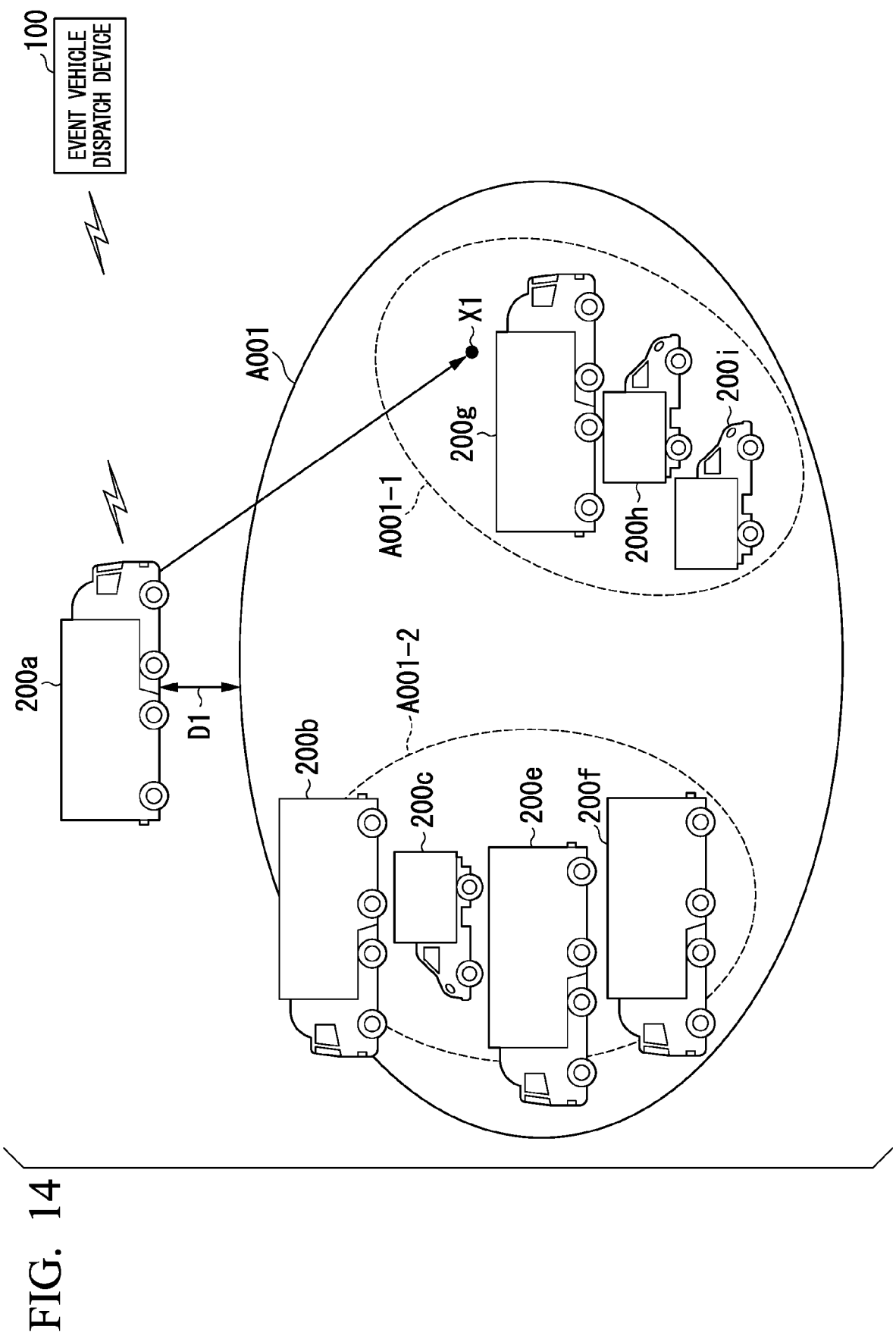
FIG. 14 is a diagram showing an aspect of an instruction for parking positions of vehicles by an instructor.

FIG. 14 is a diagram showing an aspect of an instruction for parking positions of the vehicles 200 by the instructor 160. The instructor 160 acquires positional information of the vehicles 200. For example, when a shortest distance D1 between a traveling position of the vehicle 200a participating in the event and area "A001" of the event site is within a threshold (for example, 100 m), the instructor 160 notifies the vehicle 200a of a parking position of the vehicle 200a with regard to area "A001." The vehicle 200a that is notified of performs the automated driving by the automated driving controller 250, and moves to the instructed parking position and stops. The information regarding the parking position is stored as the parking position management information 177 in the storage 170.

FIG. 15 is a diagram showing an example of content of the parking position management information 177. In the parking position management information 177, a parking position of a vehicle in the area in which the event is performed is associated with the vehicle ID. The instructor 160 may generate the parking position management information 177 at a time point at which the vehicles 200 participating in the event are confirmed or may generate the parking position management information 177 at a time point at which the vehicles 200 arrive at the vicinity of the area.

The instructor 160 may output information regarding a parking position instruction to the terminal device 300 of the owner O of the vehicle 200 or may post the information regarding the parking position instruction on an electric bulletin board or the like installed in an entrance gate or the like of area "A001." Based on the supported information, the vehicle 200 moves to an instructed place and stops or the owner O who is a driver of the vehicle 200 moves the vehicle 200 to the instructed place and stops.

When the vehicles 200 participating in the event are parked at the event site, the instructor 160 may group the vehicles 200 for each vehicle attribute so that the vehicle 200 can be parked together in the area. The instructor 160 may set a plurality of sub-areas (for example, areas "A001-1" and "A001-2" in FIG. 14) at the event site A001 and notify of the parking positions so that the vehicles are parked together in accordance with the same vehicle attribute ID for each sub-area. In the example of FIG. 14, vehicles 200a, 200g, 200h, and 200i are parked in sub-area "A001-1" and vehicles 200b, 200c, 200e, and 200f are parked in sub-area "A001-2." In this way, by disposing the plurality of vehicles 200 together for each service supplied by each vehicle, it is possible to provide a service together in a food area, a lodging area, or the like for each sub-area.

The instructor 160 may combine and group the vehicles of different vehicle attributes and allow the vehicles to be parked in sub-areas determined in units of groups. Thus, a plurality of different services can be provided in units of sub-areas.

[Process Flow]

Figure 16:
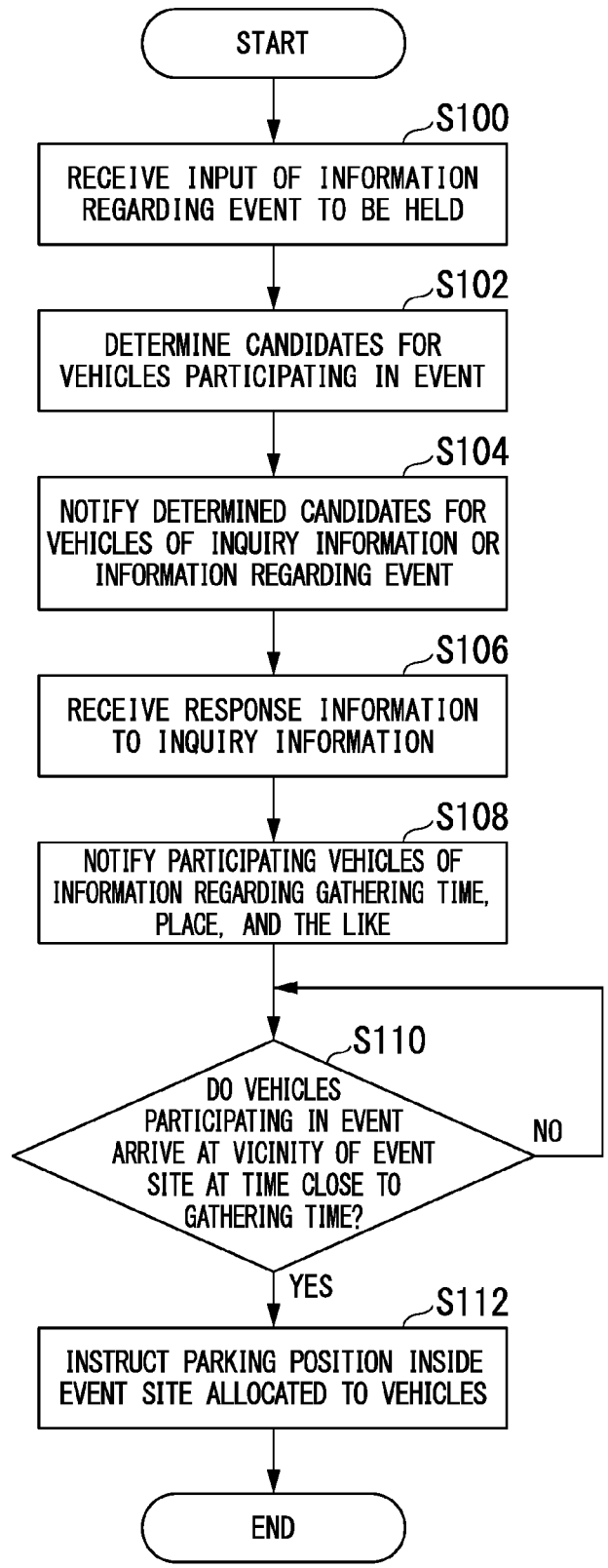
FIG. 16 is a flowchart showing an example of a flow of a process performed by an event vehicle dispatch device according to the first embodiment.

Next, a flow of a process performed by the event vehicle dispatch device 100 according to the first embodiment will be described. FIG. 16 is a flowchart showing an example of a flow of a process performed by the event vehicle dispatch device 100 according to the first embodiment. The event vehicle dispatch device 100 causes the supervisor or the like to receive an input of information regarding an event to be held (step S100). Subsequently, the event vehicle candidate determiner 140 determines candidates for the vehicles participating in the event (step S102). Subsequently, event notifier 150 notifies one or both of the vehicle 200 and the terminal device 300 with regard to the determined candidates for the vehicles, of the inquiry information and the information regarding the event (step S104).

Subsequently, the event notifier 150 in the event vehicle dispatch device 100 receives response information to the inquiry and manages the notification result management information 176 based on the received response information (step S106). Subsequently, the event notifier 150 notifies the vehicles 200 participating in the event of information regarding a gathering time, place, and the like (step S108).

The instructor 160 determines whether the vehicles 200 participating in the event arrive at the vicinity of the event site at a time close to the gathering time (step S110). When the vehicles 200 participating in the event does not arrive at the vicinity of the event site, the instructor 160 waits until the vehicles 200 arrive at the vicinity of the event site. When the vehicles 200 arrive at the vicinity of the event site, the instructor 160 instructs the vehicles 200 of a parking position at the event site allocated to the vehicle 200 (step S112). Then, the process of the flowchart ends. In the process of step S108, when a predetermined time exceeds the gathering time of the event, the flowchart may end.

As described above, according to the first embodiment, it is possible to gather the vehicles efficiently in accordance with the event and provide the service by the vehicles. According to the first embodiment, by gathering the plurality of vehicles capable of providing a variety of services to a specific area, it is possible to dynamically construct, for example, a facility such as a shopping mall. According to the first embodiment, for example, when a temporary event is held, it is possible to construct a facility providing a service quickly and remove the facility quickly after the event ends.

Second Embodiment

Next, an event vehicle dispatch system 2 according to a second embodiment will be described. According to the second embodiment, an event vehicle dispatch device 100A notifies a user U who will use an event of the event and performs pick-up vehicle dispatch of a vehicle 200 to the user who participates in the event and desires pick-up.

Figure 17:
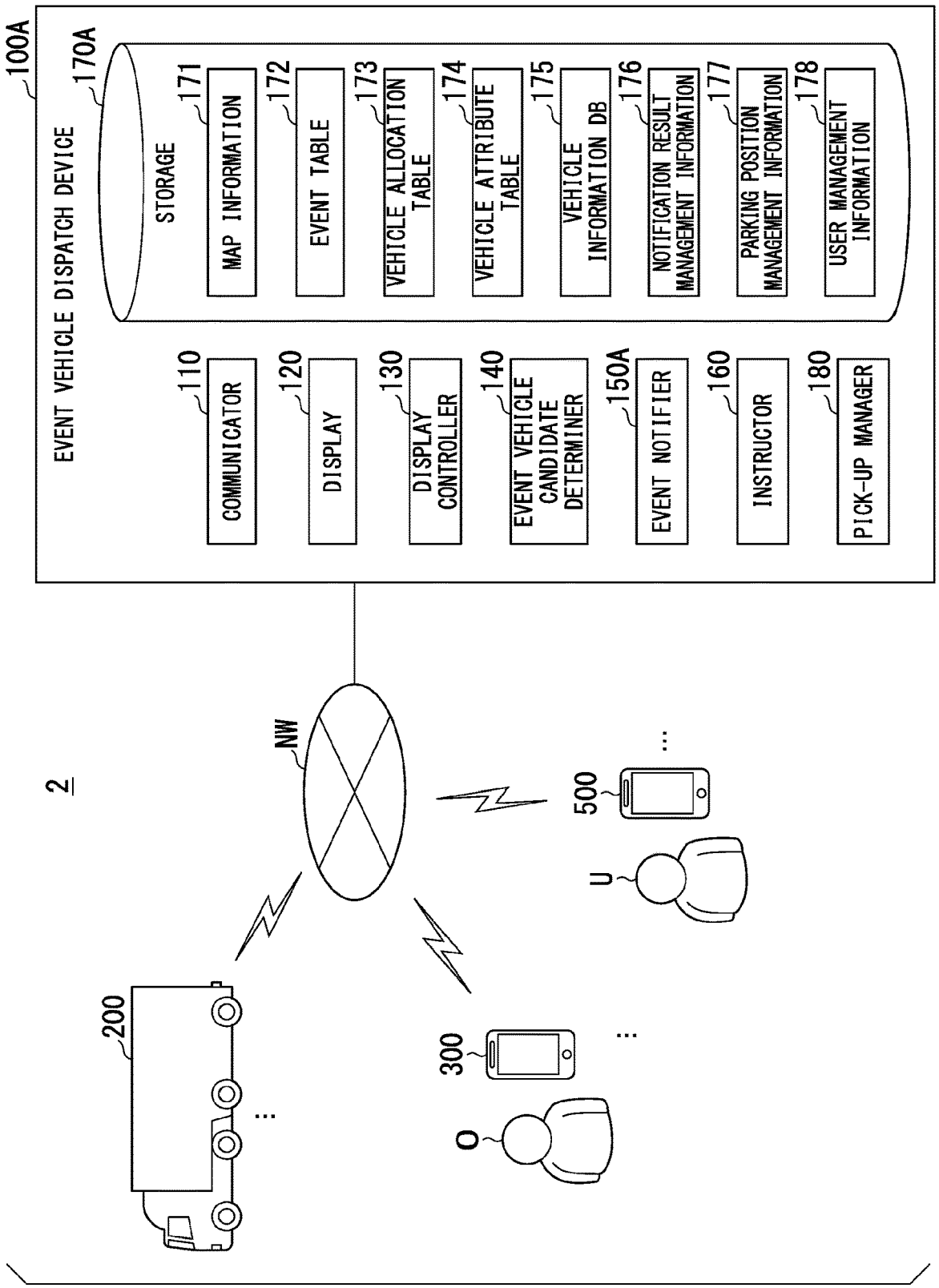
FIG. 17 is a diagram showing a configuration of an event vehicle dispatch system according to a second embodiment.

FIG. 17 is a diagram showing a configuration of the event vehicle dispatch system 2 according to the second embodiment. In the event vehicle dispatch system 2, the terminal device 500 used by the system user U is connected to the network NW. Since the terminal device 500 has similar functions to those of the above-described terminal device 300, specific description thereof will be omitted herein. The event vehicle dispatch device 100A includes an event notifier 150A and a pick-up manager 180, and user manager information 178 is stored in the storage 170A. The functions of other constituent elements are the same as those of the first embodiment. Accordingly, in the following description, a function of the pick-up manager 180 will be described mainly.

The event notifier 150A notifies the terminal device 500 used by the user U of event information and pick-up confirmation information indicating whether to desire pick-up to the event site is confirmed using address information of the user U by using the event stored in advance in a user management information 178 in addition to the function of the event notifier 150 according to the first embodiment. Thus, the event information is notified on a screen of the terminal device 500.

Figure 18:
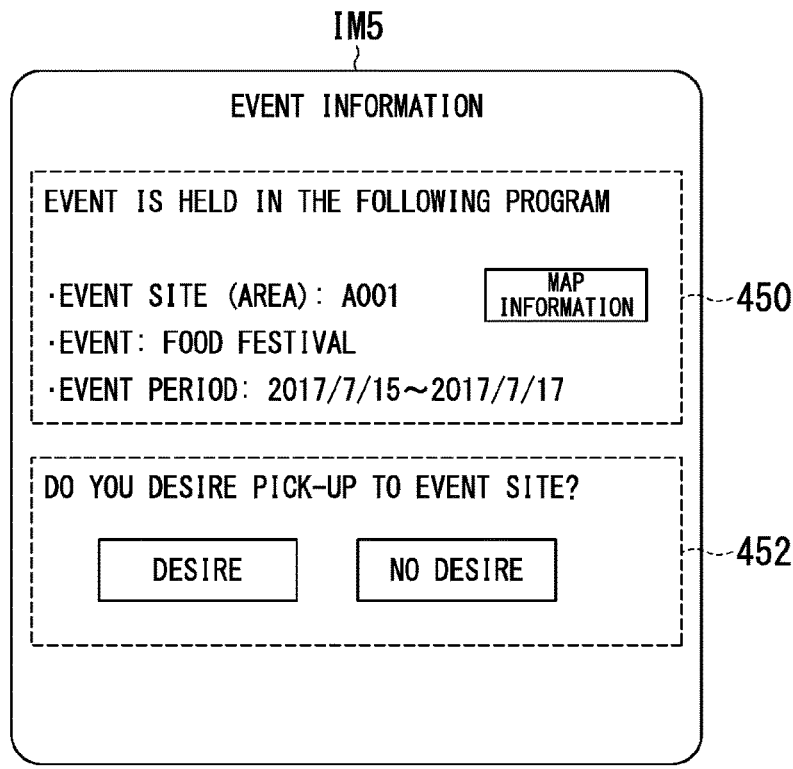
FIG. 18 is a diagram showing an example of an event information screen displayed on a terminal device.

FIG. 18 is a diagram showing an example of an event information screen IM5 displayed on the terminal device 500. On the event information screen IM5, an event information display region 450 and an event pick-up confirmation region 452 are shown. On the event information display region 450, information regarding an event site, event content, and an event period is shown. In the event pick-up confirmation region 452, two kinds of buttons for selecting whether to desire pick-up to the event site are shown.

When the user U confirms information shown in the event information display region 450 and thinks that the user U wants the pick-up to the event site, the user U selects a "Desire" button in the event pick-up confirmation region 452. When the user U does not want the pick-up, the user U selects a "No desire" button. The terminal device 500 receives a selection of the "Desire" button or the "No desire" button and transmits a received selection result to the event vehicle dispatch device 100A.

Figure 19:
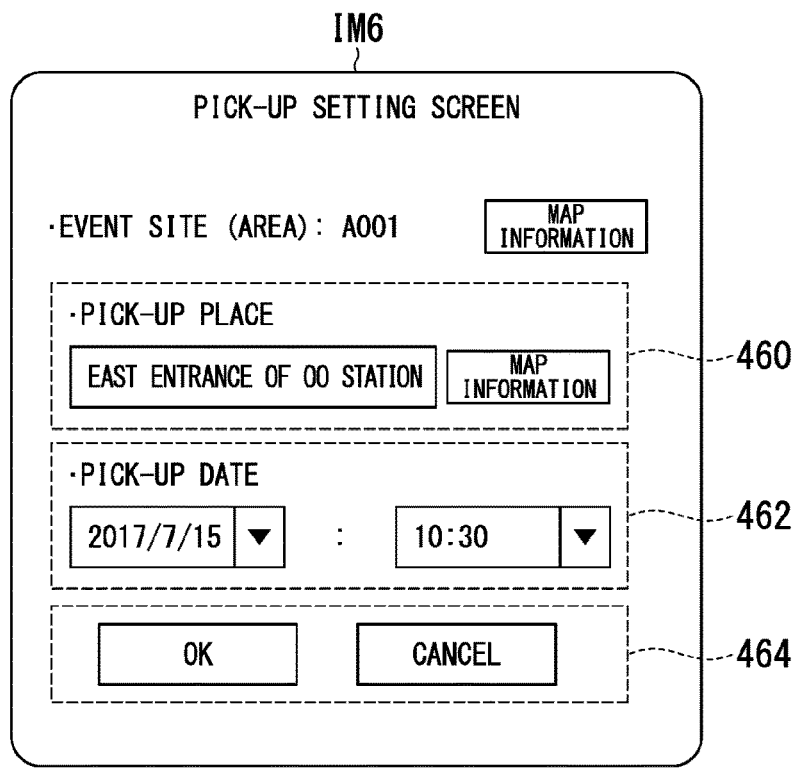
FIG. 19 is a diagram showing an example of a pick-up setting screen.

When the terminal device 500 receives a selection indicating desire for pick-up, the pick-up manager 180 of the event vehicle dispatch device 100A causes the terminal device 500 to display the pick-up setting screen IM6. FIG. 19 is a diagram showing an example of the pick-up setting screen IM6. On the pick-up setting screen IM6, information regarding the event site is shown. On the pick-up setting screen IM6, a pick-up place designation region 460 in which a pick-up place is designated, a pick-up date destination region 462 in which a pick-up date is designated, and a confirmation operation region 464 in which execution or cancellation of pick-up based on input content is confirmed are shown.

In the pick-up place designation region 460, a text box used for a user to designate a pick-up place is shown. The user U designates a pick-up place by inputting "east entrance of OO station" in the text box. In the pick-up place designation region 460, a map information button used to designate a place at which the user boards a pick-up vehicle is shown. When a selection of the map information button is received, a map including the map information 171 is displayed and a place selected by the user is set as a pick-up place.

In the pick-up date destination region 462, a date and a time are shown in two list boxes used for designation. In the list boxes, a date or a time corresponding to a period in which the event is held is shown. For example, in the list box of the date, "2017/7/15," "2017/7/16," and "2017/7/17" which are dates corresponding to dates on which the event is held are shown.

When the selection of an OK button is received in the confirmation operation region 464, the terminal device 500 receives a selection of a pick-up vehicle dispatch process and confirms cancellation of pick-up by receiving a selection of a cancellation button. The pick-up manager 180 may receive not only pick-up setting from the pick-up place to the event site but also pick-up setting from the event site to another place on the pick-up setting screen IM6.

The pick-up manager 180 stores information set on the pick-up setting screen IM6 in the user management information 178. FIG. 20 is a diagram showing an example of content of the user management information 178. In the user management information 178, a user address for communicating with the terminal device 500 used by the user U, a vehicle dispatch flag for identifying whether to perform vehicle dispatch to a user, a vehicle ID, a pick-up place arrival date, and a pick-up place are associated with the user ID for identifying the user U. A user registered in the user management information 178 is a user registered for notifying of information regarding an event in advance. The pick-up manager 180 registers the user address in association with the user ID at the time of registration of the user.

In the vehicle dispatch flag, information corresponding to whether to desire the pick-up to the event site by the user U is stored in accordance with the event pick-up confirmation region 452 of the event information screen IM5. In the example of FIG. 20, when the pick-up to the event site is desired, "1" is set in the vehicle dispatch flag. When the pick-up is not desired, "0" is set in the vehicle dispatch flag. When whether the user U desires the pick-up to the event site is not selected, the vehicle dispatch flag is blank.

When a vehicle for the pick-up is dispatched to the user, the pick-up manager 180 sets a pick-up place and a pick-up date set in the pick-up setting screen IM6 to the pick-up place and the pick-up place arrival date of the user management information 178. The pick-up manager 180 selects the vehicle 200 for the pick-up and stores the vehicle ID of the selected vehicle 200 in the user management information 178. The pick-up manager 180 notifies the selected vehicle 200 of information regarding the pick-up place arrival date or the pick-up place. The vehicle 200 notified of the information performs automated driving by the automated driving controller 250 to pick up the user U.

Figure 21:
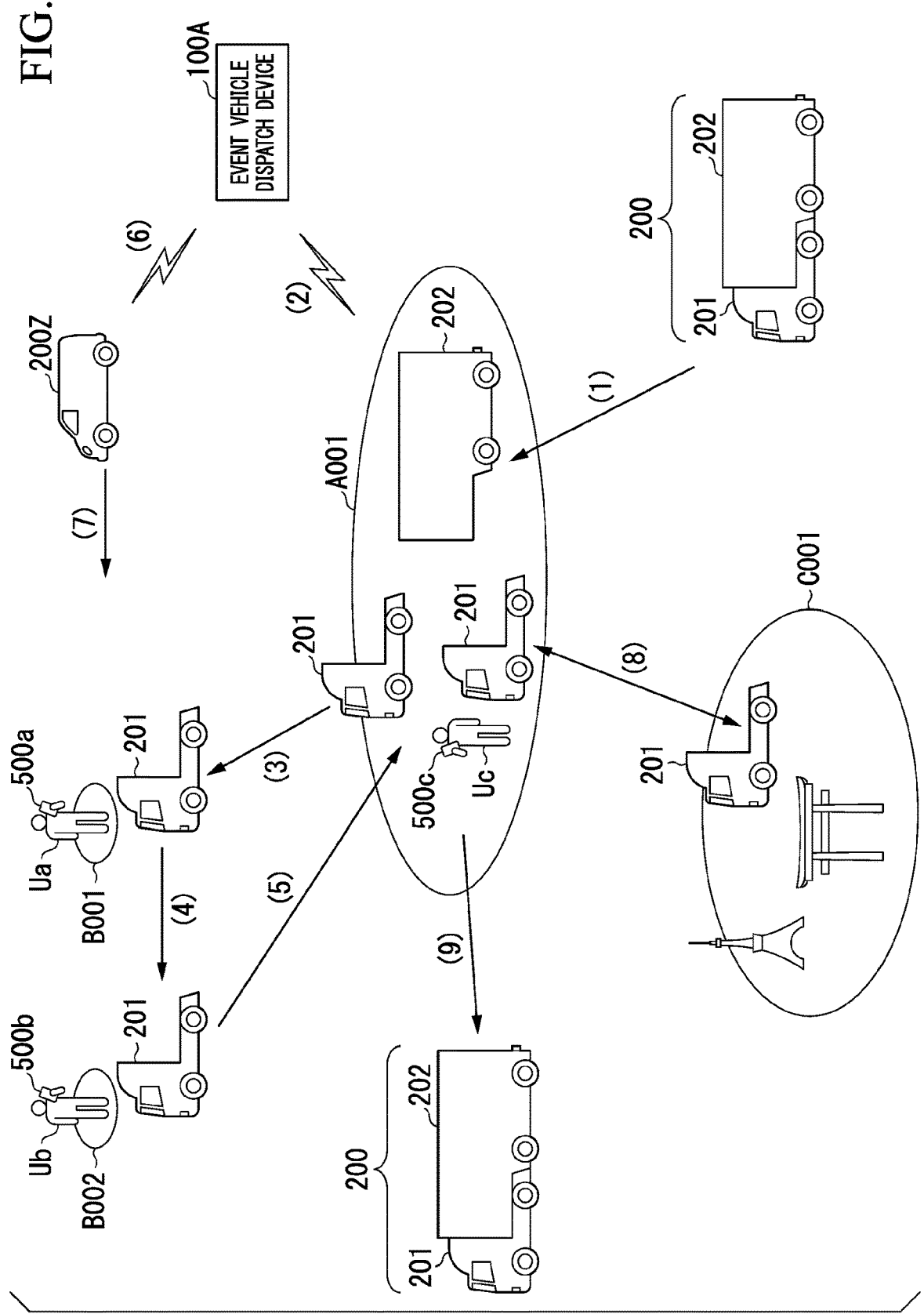
FIG. 21 is a diagram showing an aspect of pick-up in which a vehicle is used.

FIG. 21 is a diagram showing an aspect of pick-up in which the vehicle 200 is used. In the example of FIG. 21, a pick-up pattern of the vehicle 200 according to the second embodiment is shown. In the example of FIG. 21, the vehicle 200 is, for example, a trailer vehicle or a track vehicle that includes a vehicle body 201 and a cargo stand 202. The vehicle body 201 tows the cargo stand 202. The vehicle body 201 can be detachably connected to the cargo stand 202. The vehicle body 201 has a similar configuration to the configuration of the vehicle 200 shown in FIG. 2, as described above. The cargo stand 202 includes a facility that provides a service corresponding to a vehicle attribute.

For example, when the vehicle 200 moves to area "A001" of the event site to participate in the event and receives an instruction of a parking place from the event vehicle dispatch device 100A, the vehicle 200 parks at an instructed place ((1) in the drawing). Here, when pick-up setting is performed from the terminal device 500 of the user U entering the event, the pick-up manager 180 of the event vehicle dispatch device 100A selects the vehicle 200 to pick up the user U among one or more vehicles 200 parked in area "A001" and transmits a pick-up instruction including a pick-up time and a pick-up place to the selected vehicle 200 ((2) in the drawing).

The vehicle body 201 receiving the pick-up instruction generates a route of automated driving for arriving at the pick-up place at the pick-up time when there is no other traveling schedule during several hours before and after the pick-up time and the pick-up is possible. The vehicle body 201 detaches the vehicle body 201 from the cargo stand 202 and starts traveling to a target pick-up place to arrive at the pick-up place a predetermined time (for example, 5 minutes earlier) before the pick-up time.

For example, the vehicle body 201 allows a user Ua to board at place B001 ((3) in the drawing) and thereafter allows a user Ub to board at place B002 ((4) in the drawing). The vehicle body 201 may perform an authentication process when the users Ua and Ub are allowed to board. In this case, in terminal devices 500a and 500b respectively used by the users Ua and Ub, permission information for enabling the users to board the vehicle body 201 is registered in a memory. The vehicle body 201 acquires boarding permission information by communicating with the terminal devices 500a and 500b, performs boarding authentication for the users Ua and Ub, and allows the users to board when boarding is permitted.

The vehicle body 201 picks up the users Ua and Ub allowed to board to area "A001" ((5) in the drawing). The pick-up manager 180 issues route information in which a representative place (for example, a central place or a place equivalent to an entrance) of area "A001" is a transit place to the vehicle body 201 when a plurality of vehicles are disposed in area "A001." Thus, the vehicle body 201 can pick up the users Ua and Ub to an appropriate position of area "A001." In this way, by picking up the users U using the vehicle 200 participating in the event, it is possible to provide a service for improving convenience for the users. By causing the cargo stand 202 to remain parked in area "A001" and picking up the users using only the vehicle body 201, it is possible to improve fuel efficiency due to weight reduction and efficiently utilize the vehicle 200.

The pick-up manager 180 of the event vehicle dispatch device 100A may transmit a pick-up instruction to a vehicle 200Z which does not participate in the event ((6) in the drawing). When the pick-up is possible, the vehicle 200Z performs automated driving, allows the users U to board, and performs the pick-up to area "A001" ((7) in the drawing).

The vehicle body 201 may pick up a user U in area "A001" to a destination. For example, when a user Uc who does not use a lodging facility provided in the cargo stand 202 wants to move to a tourist site C001, pick-up setting is performed in the terminal device 500. The pick-up manager 180 of the event vehicle dispatch device 100A selects the vehicle 200 allowing the user to board to the designated tourist site C001 and outputs a pick-up instruction to the selected vehicle 200. The example of FIG. 21 is an example in which the vehicle body 201 generates a route to the tourist site, causes the automated driving controller 250 to perform automated driving along the generated route, and performs the pick-up to the tourist site C001 for the user Uc ((8) in the drawing). The vehicle body 201 may return to area "A001" after the vehicle body 201 allows the user Uc to get out at the tourist site C001 or may allow the user Uc who has done sightseeing to board again and perform the pick-up to area "A001."

When the cargo stand 202 of the vehicle 200 is a lodging facility, the vehicle 200 may be moved to another place while the cargo stand 202 may be used as the lodging facility ((9) in the drawing). For example, when the vehicle is moved to a next destination in the night, the vehicle 200 moves in a state of connection with the cargo stand which is a lodging facility so that a user can be moved while the user sleeps. Thus, since movement to a subsequent destination during sleeping hours is possible, an efficient travel plan can be executed. When the vehicle 200 moves with each cargo stand 202, for example, a user can travel around each tourist site while lodging.

[Process Flow]

Figure 22:
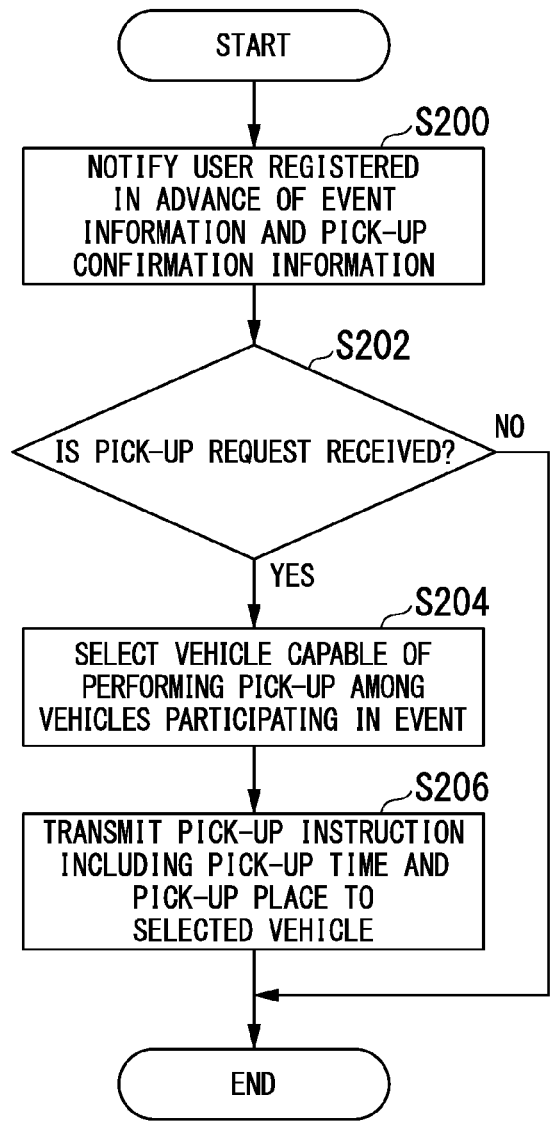
FIG. 22 is a flowchart showing an example of a flow of a process performed by an event vehicle dispatch device according to the second embodiment.

Next, a flow of a process performed by the event vehicle dispatch device 100A according to the second embodiment will be described. FIG. 22 is a flowchart showing an example of a flow of a process performed by the event vehicle dispatch device 100A according to the second embodiment. FIG. 22 shows an example of a process performed in addition to the process performed by the above-described event vehicle dispatch device 100.

The event notifier 150A notifies a user registered in advance of the event information and the pick-up confirmation information (step S200). Subsequently, the pick-up manager 180 determines whether a pick-up request is received from the user U (step S202). When the pick-up request is received, the pick-up manager 180 selects a vehicle capable of performing the pick-up among the vehicles 200 participating in the event (step S204). Subsequently, the pick-up manager 180 transmits a pick-up instruction including a pick-up time and a pick-up place to the selected vehicle 200 (step S206). Then, the process of the flowchart ends.

As described above, according to the second embodiment, it is possible to perform the pick-up for users using an event using an automated driving vehicle in addition to similar advantageous effects to those of the first embodiment. Further, according to the second embodiment, by performing the pick-up using a vehicle providing a service at an event, it is possible to efficiently use the vehicle.

Application Example

Next, an application example in which a vehicle is used in the first and second embodiments will be described. A travel plan in which it is assumed that the vehicle 200 moves during lodging using a lodging facility of the vehicle 200 in the first and second embodiments can be provided, for example, in the navigation device 230 of the vehicle 200.

Figure 23:
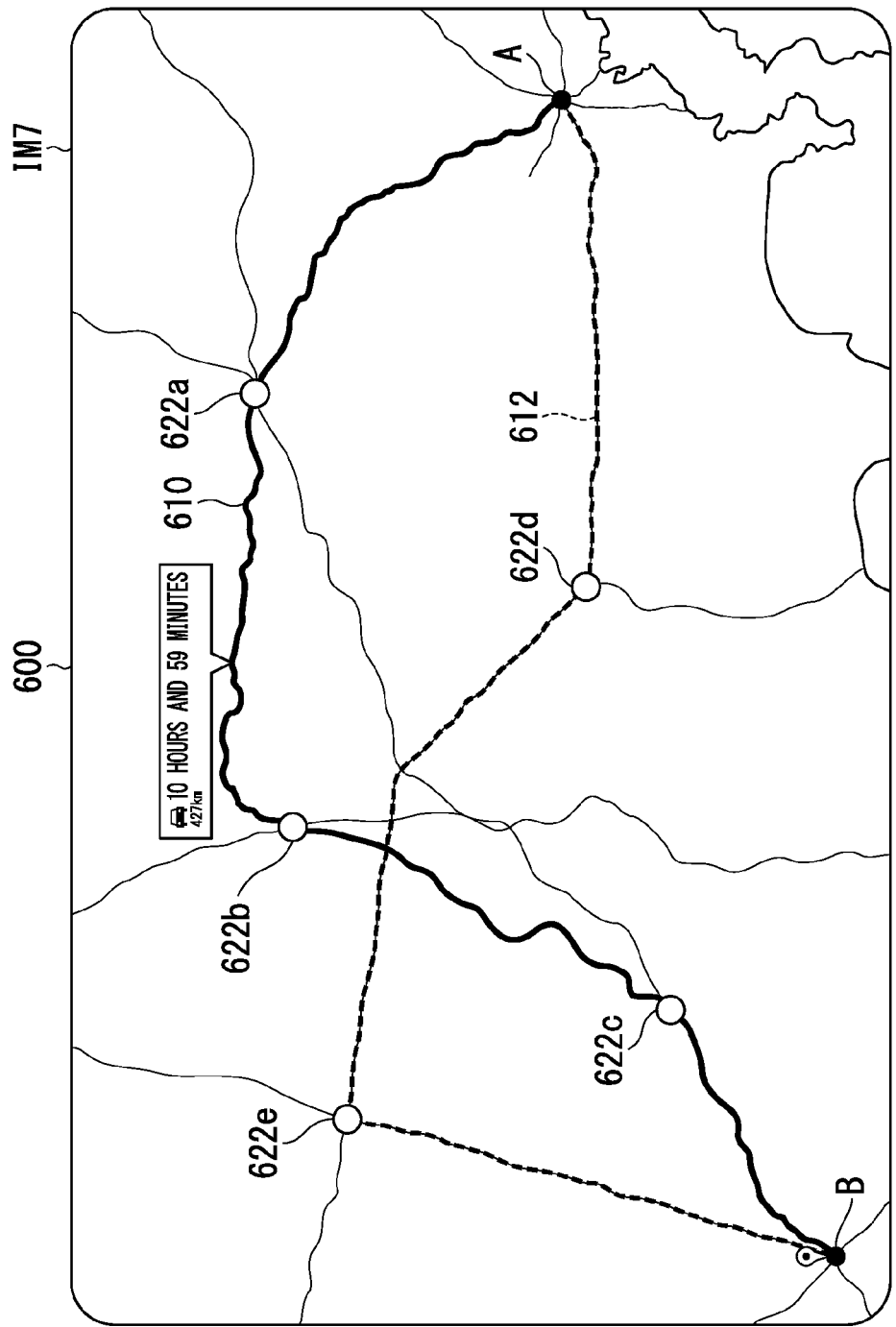
FIG. 23 is a diagram showing an example of a navigation screen of a travel plan.

FIG. 23 is a diagram showing an example of a navigation screen IM7 of a travel plan. On the navigation screen IM7, a route is generated by the navigation device 230 when an occupant sets a destination. In this case, the navigation device 230 generates a route along which the user lodges at tourist sites on the way to the destination, as described above, and displays the generated route as the navigation screen IM7 in the HMI 232. On the navigation screen IM7, a route 610 from a current place (a place A in the drawing) to a destination (a place B in the drawing) of the vehicle 200 is generated in a map image 600. On the navigation screen IM7, the route 610 along which the vehicle goes through a plurality of parking areas 622a to 622c in which lodging is possible until the vehicle arrives at the place B from the place A is displayed. The parking areas 622a to 622c are, for example, places at which the plurality of vehicles 200 gather in accordance with the event provided according to the first and second embodiments. The parking areas 622a to 622c may be places at which night scenery is beautiful or places, tourist attractions, or the like at which regional specialties can be eaten and drunk.

On the navigation screen IM7, another route 612 along which the vehicle can arrive at the destination via other parking areas 622d and 622e is displayed. The occupant performs navigation of the vehicle 200 by selecting either the route 610 or 612.

The above-described routes may be generated by the event vehicle dispatch device 100A. In this case, for example, the terminal device 500 used by the user U transmits information regarding the current position and the destination to the event vehicle dispatch device 100A. The event vehicle dispatch device 100A can perform travel using the allocated vehicle 200 by performing generation of route candidates and allocation or the like of the vehicle based on information acquired from the terminal device 500, transmitting information regarding the generated route candidates and the allocated vehicle to the terminal device 500, and allowing the user U to select a route.

In this way, according to the application example, it is possible to provide the travel plan in which the lodging facility of the vehicle 200 is assumed. Thus, for example, it is possible to utilize inland cities as relay places to the destination and employ the inland cities for regional vitalization or the like of the inland cities. According to the application example, the vehicle 200 can provide an optimum route for enjoying tourist sites or the like without depending on a travel time or a travel distance. According to the application example, it is possible to provide a service in which a lodging function is added to long-haul movement and it is possible to provide a lodging movement service along a route selected by the user more freely compared to a sleeping train or an express bus.

Third Embodiment

Figure 24:
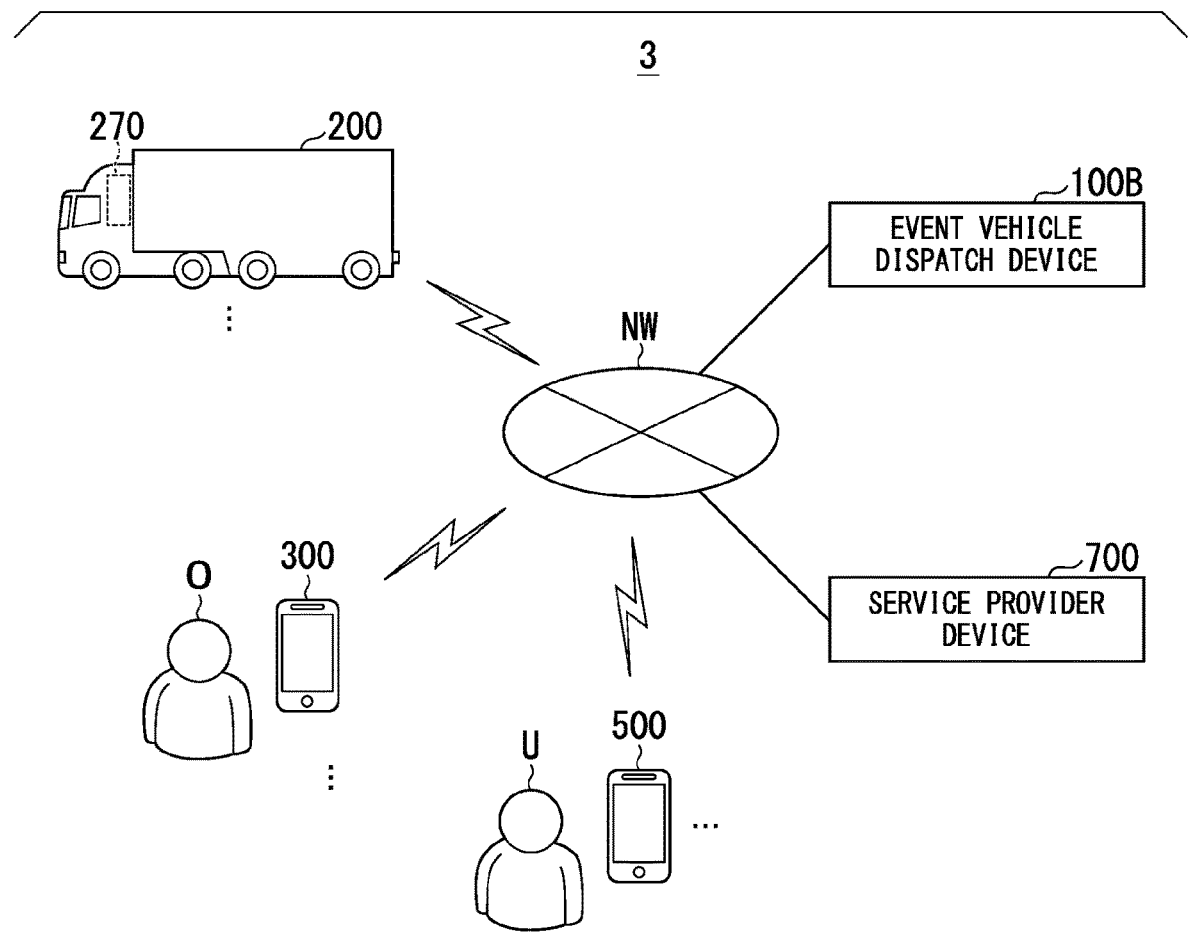
FIG. 24 is a diagram showing a configuration of an event vehicle dispatch system according to a third embodiment.

Next, an event vehicle dispatch system 3 according to a third embodiment will be described. In the third embodiment, an external service provider (a service provider or a third party) provides at least a part of the event dispatch service. FIG. 24 is a diagram showing a configuration of the event vehicle dispatch system 3 according to the third embodiment. The event vehicle dispatch system 3 includes an event vehicle dispatch device 100, one or more vehicles 200, the terminal devices 300 used by the owners O of the one or more vehicles 200, the terminal device 500 used by the user U, and a service provider device 700 used by an external service provider. These constituent elements can communicate with one another via the network NW. Hereinafter, a function of each of the terminal device 300, the vehicle 200, the terminal device 500, the event vehicle dispatch device 100B, and the service provider device 700 will be described.

[Terminal Device 300]

The terminal device 300 receives an operation from the owner O to designate a date and time, an area, and the like at which an event is held and transmits the designated information to the event vehicle dispatch device 100B. Here, the owner O may be an event owner who holds an event in addition to the owner of the vehicle 200 or may be a predetermined organization such as a local government. The terminal device 300 may order an additional service to the service provider device 700.

[Vehicle]

In the third embodiment, in a configuration related to travel control of the vehicle 200 (for example, a configuration related to automated driving), a vehicle management device 270 is mounted in addition to the configuration in which the vehicle 200 in the first embodiment is included. Accordingly, the configuration of the vehicle management device 270 will be mainly described below.

Figure 25:
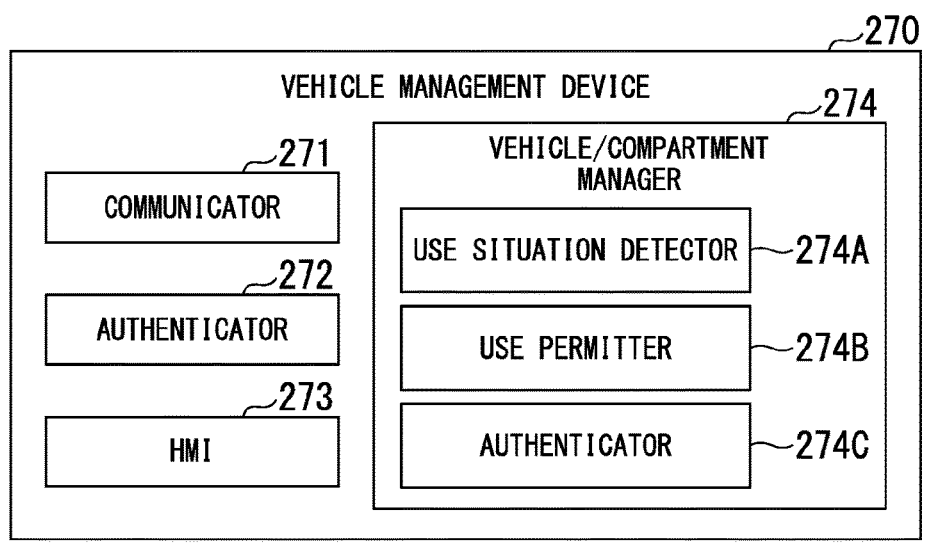
FIG. 25 is a diagram showing an example of a configuration of a vehicle management device mounted in a vehicle according to the third embodiment.

FIG. 25 is a diagram showing an example of a configuration of the vehicle management device 270 mounted in the vehicle 200 according to the third embodiment. The vehicle management device 270 includes, for example, a communicator 271, an authenticator 272, an HMI 273, and a vehicle/compartment manager 274. The communicator 271 is, for example, a wireless communication device. The communicator 271 communicates with the event vehicle dispatch device 100B via the network NW. The authenticator 272 performs an authentication process to start the service in accordance with an instruction of the event vehicle dispatch device 100B. The HMI 273 is a touch panel display device (display), a speaker, a microphone, or any of various operational switches provided apart from the HMI 232. The HMI 273 may include not only a vehicle interior interface but also a vehicle exterior interface.

The vehicle/compartment manager 274 includes, for example, a use situation detector 274A, a use permitter 274B, and an authenticator 274C. In the vehicle 200, one or more spaces (compartments) which can be used by the user U are provided. The compartment is, for example, a placement region or the like in which a seat or luggage is placed. For example, the compartment may be a region divided by a predetermined partition. The vehicle/compartment manager 274 controls a mechanism that drives a seat or a placement region and changes a seat into a placement region or changes a placement region into a seat. Further, for example, the vehicle/compartment manager 274 accommodates a seat in an accommodation portion that accommodates the seat or takes out the seat accommodated in the accommodation portion from the accommodation portion.

The use situation detector 274A detects a use situation of each compartment. For example, the use situation detector 274A detects whether each compartment is in use. In FIG. 24, a trailer vehicle is shown as the vehicle 200, but the vehicle 200 may be a vehicle such as a passenger car, a bus, or a microbus that has a size in which one or more occupants of the compartments divided inside the vehicle can board. For example, when authentication by the authenticator 274C succeeds, the use permitter 274B permits to use a compartment designated in advance and, for example, unlocks a door. The authenticator 274C performs authentication such as identity verification of the user U who will board.

For example, the vehicle management device 270 transmits vehicle information including the following content to the event vehicle dispatch device 100B.

[Vehicle Information]
  Vehicle ID
  Positional information (latitude, altitude, and longitude)
  Compartment use situation (a user ID of a service user who is using the compartment which is in use, information regarding usable compartments, or the like)
  Traveling state (a speed, acceleration, angular velocity, in-vehicle device state, or the like)
  Information regarding a service provider (an ID of a service provider, information regarding a service which is in operation, a service execution elapsed time, or the like)

[Terminal Device 500]

The terminal device 500 transmits, for example, service use request information including the following content to the event vehicle dispatch device 100B. The positional information is, for example, information obtained through positioning by a GPS receiver included in the terminal device 500. Other information is based on information input by the user U in principle. Use desire service provider attribute information is, for example, information regarding an attribute of a service provider desired by the user U. The attribute may include, for example, age, sex, and personality (type) in addition to a kind of service to be provided. For the attribute, the event vehicle dispatch device 100B may present a service provider to the user U for selection or confirmation rather than allocating a completely matched service provider in a fixed manner.

[Service Use Request Information]
  User ID
  Positional information (latitude, altitude, and longitude)
  Use desire space information (for example, expressed in accordance with the number of people, the number of seats, or the like)
  Use desire service provider attribute information
  Use desire service ID
  Use desire section information (information regarding a first section)
  Information regarding a period of time of service use desired by the user U
  Settlement authentication information

[Service Provider Device]

Figure 26:
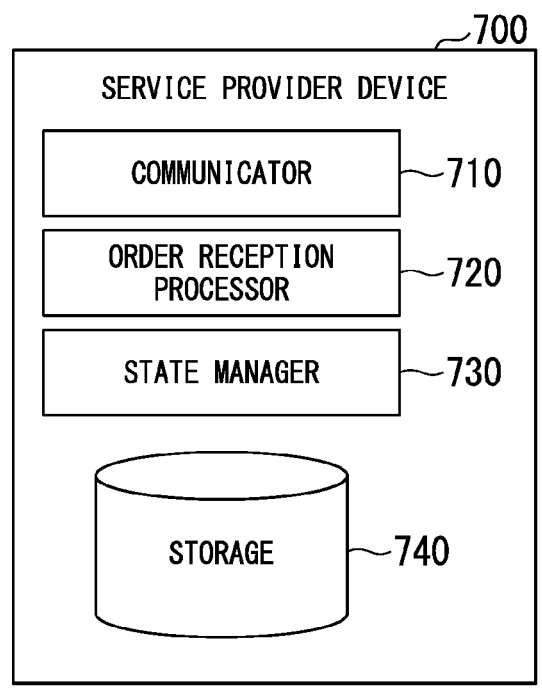
FIG. 26 is a diagram showing an example of a configuration of a service provider device according to the third embodiment.

FIG. 26 is a diagram showing an example of a configuration of the service provider device 700 according to the third embodiment. The service provider device 700 is, for example, a device that can ascertain a plurality of service provider states and automatically responds to an order from the event vehicle dispatch device 100B. The service provider device 700 includes, for example, a communicator 710, an order reception processor 720, a state manager 730, and a storage 740. The order reception processor 720 and the state manager 730 are realized, for example, by causing a processor such as a CPU to execute a program (software) stored in the storage 170. Some or all of the function units may be realized by hardware (a circuit including circuitry) such as an LSI, an ASIC, an FPGA, or a GPU, or may be realized by software and hardware in cooperation. The program may be stored in advance in the storage 740 such as an HDD or a flash memory or may be stored in a storage medium detachably mounted on a DVD, a CD-ROM, or the like so that the storage medium is mounted on a drive device (not shown) and is installed on the storage 740. The service provider device 700 may include a part or the entirety of the configuration of the event vehicle dispatch device 100B.

The communicator 710 communicates with the event vehicle dispatch device 100B, the vehicle 200, the terminal device 300, or the like via the network NW. The order reception processor 720 performs an order reception process on a service order from the event vehicle dispatch device 100B. The order reception processor 720 determines whether the order content of the service is within a range of service provision information already transmitted to the event vehicle dispatch device 100B. When the order reception processor 720 determines that the order content is within the range, the order reception processor 720 first performs the order reception process. The state manager 730 manages the service provider states (a reservation state, an activation state, and the like) registered in the service provider device 700 and provides the service provision information including the following content to the event vehicle dispatch device 100B.

For example, the service provider device 700 transmits the service provision information to the event vehicle dispatch device 100B. The service provision information is information regarding a service of which an order can be received by the service provider.

[Service Provision Information]
  Order reception ID
  Service name
  Information regarding a person in charge of execution
  Service provider attribute information
  Information regarding a period of service provision time desired by a service provider
  Necessary vehicle compartment information
  Information regarding region in which a service can be provided
  Necessary vehicle compartment information
  Information regarding an area in which an order can be received
  Information regarding a time at which an order can be received Facility position information (service provision place information outside vehicle)

Service status

When there is a control request for the compartment or a request for providing contents from the event vehicle dispatch device 100B, the service provider device 700 transmits contents to the vehicle management device 270 in response to the request. In this case, a storage device of the service provider device 700 stores various kinds of contents associated with content IDs. The various kinds of contents may be stored in advance in the storage device of the event vehicle dispatch device 100B. The order reception processor 720 transmits a control signal of the compartment based on a control request or information regarding vehicle exterior display or vehicle interior display of the contents for each compartment to the vehicle management device 270 and causes the vehicle 200 to perform predetermined contents display. The order reception processor 720 may receive an order of an additional service from the terminal device 300 or the like and causes the vehicle management device 270 to perform control based on the reception of the order.

The storage 740 is realized as an HDD, a flash memory, a RAM, a ROM, or the like. The storage 740 stores the service provision information and other information.

[Event Vehicle Dispatch Device]

Figure 27:
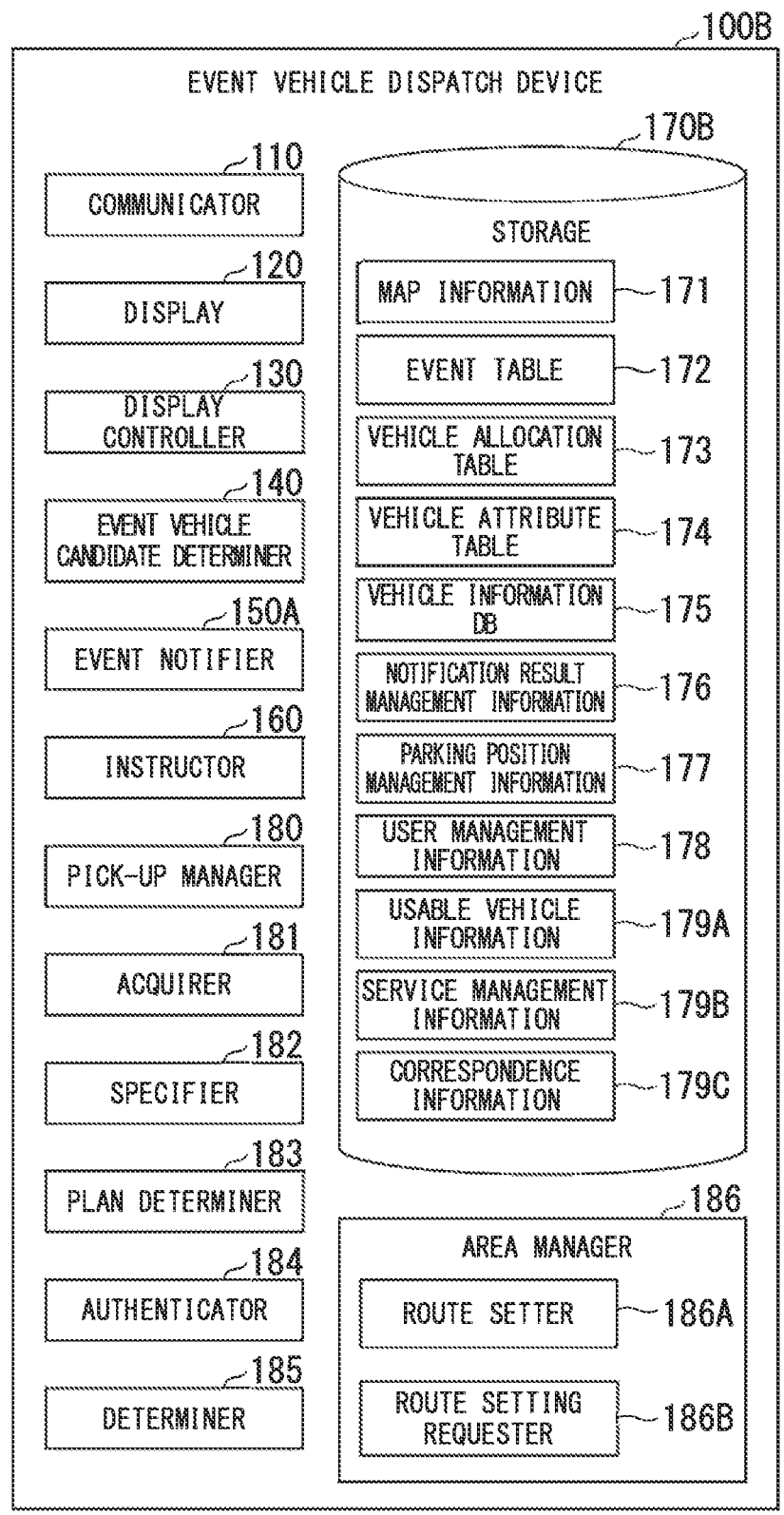
FIG. 27 is a diagram showing an example of a configuration of an event vehicle dispatch device according to the third embodiment.

FIG. 27 is a diagram showing an example of a configuration of the event vehicle dispatch device 100B according to the third embodiment. The event vehicle dispatch device 100B includes an acquirer 181, a specifier 182, a plan determiner 183, an authenticator 184, a determiner 185, and an area manager 186 compared to the configuration of the event vehicle dispatch device 100A according to the second embodiment. Accordingly, functions of the acquirer 181, the specifier 182, the plan determiner 183, the authenticator 184, the determiner 185, and the area manager 186 will be mainly described below.

The acquirer 181 acquires service use request information from the terminal device 500 via the communicator 110. The acquirer 181 acquires vehicle information from the vehicle management device 270 of the vehicle 200 registered in advance via the communicator 110. The acquirer 181 acquires the service provision information from the service provider device 700 via the communicator 110.

The specifier 182 specifies an area in which a plurality of vehicles can be parked based on information regarding a date or an area in which an event is held from the terminal device 300. The specifier 182 specifies the usable vehicle 200 based on the service use request information and the vehicle information and generates usable vehicle information. Specifically, the specifier 182 compares the use desire space information, the use desire section information, and information regarding a period of time of service use desired by the user U included in the service use request information with positional information included in the vehicle information and a compartment use situation, specifies a vehicle satisfying a condition that the positional information and the compartment use situation are included in the service use request information as the usable vehicle 200, and generates information regarding the specified vehicle 200 as the usable vehicle information.

The plan determiner 183 specifies available information which can be enjoyed by the user U based on the usable vehicle information and the service provision information and supplies information regarding the specified available service as an event status to the terminal device 500 of the user U via the event notifier 150A. Specifically, the plan determiner 183 sets a second section in which the service provider occupies at least a part (for example, a compartment) of the vehicle 200 based on the usable vehicle information and the service provision information and sets a third section in which the user U occupies at least a part of the vehicle 200 based on an overlapping portion of the second section and the use desire section information (the information regarding the first section) in the service use request information. When the service providers already boards the vehicle 200 before setting of the first section, the plan determiner 183 may set the first section and set the second section using a current position of the vehicle 200 as a starting point.

The plan determiner 183 may set information regarding a service providable region included in the service provision information and the third section within the overlapping range of the first section. Further, the plan determiner 183 may set the third section so that a period of time in which the user U occupies at least a part of the vehicle 200 matches information regarding a service usable period of time desired by the service user and a period of time in which the service provider occupies the vehicle matches information regarding a service provision period of time desired by the service provider. Then, the plan determiner 183 specifies an available service based on the set third section.

When the plurality of service providers sequentially provide services to a certain user U, the plan determiner 183 may set the second section to correspond to each of the plurality of service providers and set the plurality of third sections corresponding to each second section.

As another function, the plan determiner 183 may update the first section so that the first section ends at a service provision place outside the vehicle in response to an instruction from the user U using the terminal device 500. In this case, the plan determiner 183 may transmit reservation information to a facility which is at the service provision place outside the vehicle using the communicator 110 in response to an instruction from the user U using the terminal device 500 (or automatically) and receive a reservation result through the communicator 110, and may transmit the reservation result to the terminal device 500 of the user U using the communicator 110.

The instructor 160 instructs the vehicle 200 of a route along which the vehicle 200 will travel by causing the communicator 110 to transmit information regarding a use start position and a use end position of the user U and information regarding a use start position and a use end position of the service provider to the vehicle 200. The instructor 160 instructs each of the plurality of vehicles of a parking position so that the plurality of vehicles arriving at an event-held area are disposed at predetermined positions within the area.

The authenticator 184 performs authentication of the user U through communication with the terminal device 500 or authentication at a service provision start time.

The determiner 185 determines whether the vehicle 200 is used with regard to each of the service providers and the user U.

The plan determiner 183 performs various processes using a determination result of the determiner 185. For example, the plan determiner 183 may receive a change in the first section (update the first section) only in a case where the determiner 185 determines that both the user U and the service provider use the vehicle 200. This case arises, for example, when the service provider makes a suggestion to the user U to change a destination or a final destination is changed during a service based on information provided to the side of the vehicle 200. When the determiner 185 determines that the user U has already used the vehicle 200 (that is, the user extends the service or requests another service during using the service) at a time point at which the acquirer 181 receives the service use request information, the plan determiner 183 may preferentially allocate the vehicle 200 which is being used to the user U.

The storage 170B stores usable vehicle information 179A, service management information 179B, and correspondence information 179C in addition to the information stored in the storage 170A. The service management information 179B includes, for example, service request management information, reservation management information, and service management information during execution. In the service request management information, for example, each piece of service use request information acquired by the acquirer 181 is registered as a record. In the reservation management information, information regarding a reservation use section, a reservation use period of time, a transit place, an estimated time of arrival at the transit place, and the like are stored for each service. The service management information during execution, information regarding a service status, a service attribute, a service provider ID, and the like is registered. The correspondence information 179C is information transmitted from the terminal device 500 or the vehicle management device 270 and is information in which a user ID (or a driver ID driving a vehicle), a vehicle ID, and a contents ID requested by the user for use are associated with one another.

In the correspondence information 179C, a contents provision provider ID, a contents use target area ID, a contents use time, a contents interest index, and the like are associated with the contents ID. The content use target area ID is, for example, an ID indicating an area in which contents can be used. The contents use time is, for example, a time at which the contents can be used.

The area manager 186 notifies of the area information acquired by the specifier 182 based on the vehicle attribute of each of the plurality of vehicles, acquires information regarding arrival of the vehicle 200 at the area, and manages the event-held area. The area manager 186 includes, for example, a route setter 186A and a route setting requester 186B. The route setter 186A sets a route used for the unmanned vehicle 200 to arrive at the area and transmits the set route to the vehicle 200 when the vehicle 200 is an automated driving vehicle. The route setting requester 186B notifies vehicles other than the automated driving vehicle of route information to the event-held area. Thus, appropriate route information can be transmitted in accordance with the kinds of vehicles 200 and the vehicles can be guided to the event-held area.

According to the third embodiment, the event notifier 150A notifies the vehicle 200 or the owner O of the vehicle 200 within a predetermined distance from the position of the area of the area information. The event notifier 150A notifies the terminal device 500 or the like of dynamic relevant information acquired from the vehicle 200 within the area or the supervisor of the vehicle 200 as event status information.

Figure 28:
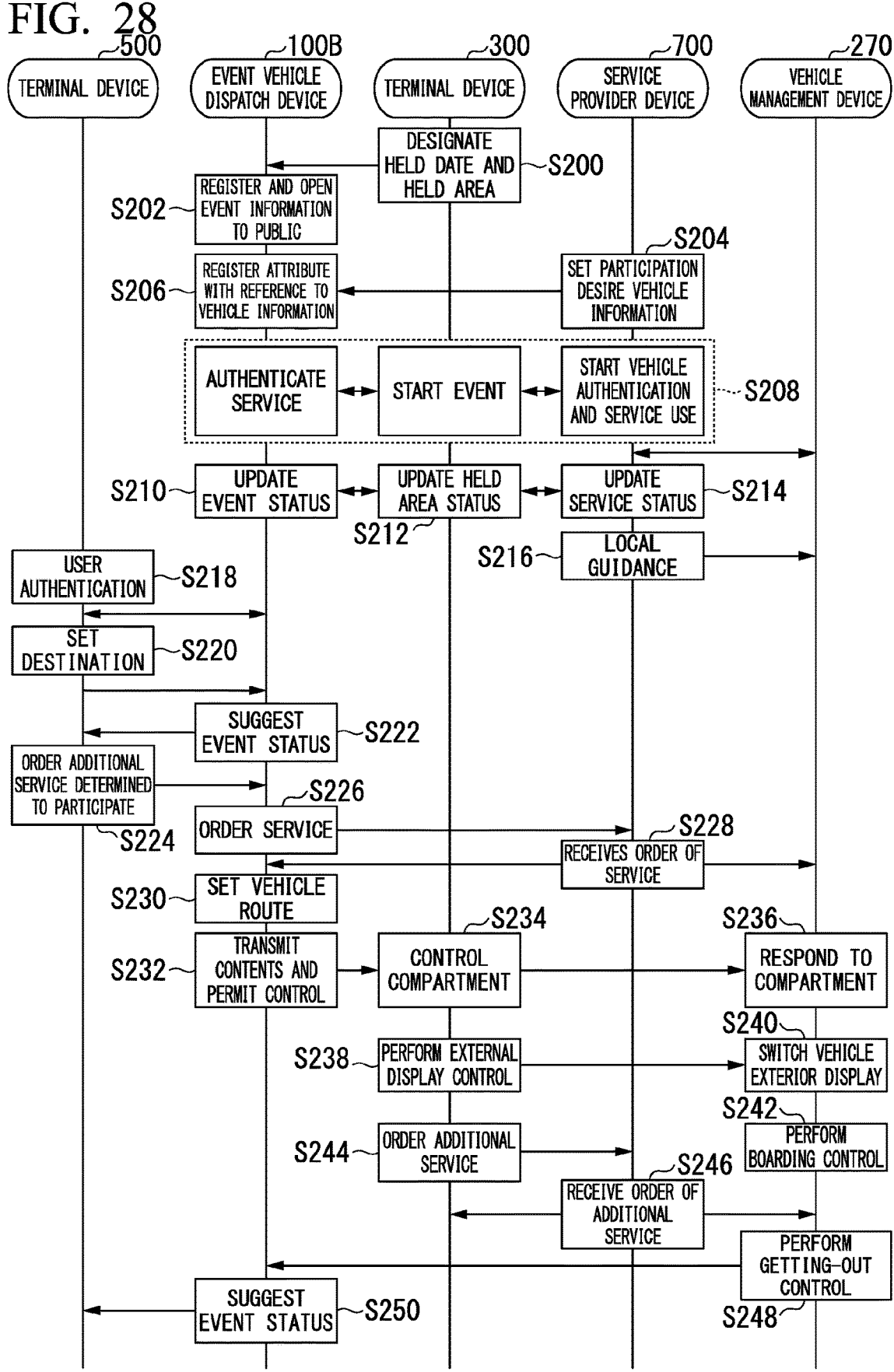
FIG. 28 is a sequence diagram showing an example of a flow of a process of the event vehicle dispatch system according to the third embodiment.

FIG. 28 is a sequence diagram showing an example of a flow of a process of the event vehicle dispatch system 3 according to the third embodiment. In the example of FIG. 28, processes in the terminal device 500 used mainly by the user, the event vehicle dispatch device 100B, the terminal device 300 used by the owner O, the service provider device 700, and the vehicle management device 270 will be mainly described.

First, information regarding a held date and a held area of an event designated by the owner O is transmitted from the terminal device 300 to the event vehicle dispatch device 100B (step S200). The owner O may be an individual owner such as an owner of the vehicle 200, a predetermined organization such as a local government, or the like. The event vehicle dispatch device 100B registers information regarding event and opens a web, a mail, or the like to the public (step S202). Subsequently, the service provider device 700 acquires the event information opened to the public by the event vehicle dispatch device 100B, sets a desire to participate in the event and vehicle information (a desired attribute such as a store) for participating in the event in the acquired event information, and transmits the event information to the event vehicle dispatch device 100B (step S204). Subsequently, the event vehicle dispatch device 100B registers the desired attribute with reference to the vehicle information from the service provider device 700 (step S206). In this way, when the vehicle (store) determines to participate in a service, an attribute (a kind of service) is added to the event. Thus, service authentication by the event vehicle dispatch device 100B and start of vehicle authentication and service use by the service provider device 700 are notified of, and the terminal device 300 is notified of start of the event (step S208). The service provider device 700 transmits service information to start the service use to the vehicle management device 270 of the participating vehicle 200 so that the service can be provided to the vehicle 200.

Subsequently, the event vehicle dispatch device 100B manages an arrival state or the like of the vehicle 200 and dynamically updates an event status of the event vehicle dispatch device 100B based on an empty state or the like of the parking region (step S210). The terminal device 300 acquires the held area status updated dynamically to correspond to the event status or the like (step S212). The service provider device 700 acquires the service status dynamically updated to correspond to the event status, the held area status, or the like (step S214). Thus, an event participant can obtain latest status information at a timing at which the event is used. The service provider device 700 may perform local guidance to the held area as necessary, on the vehicle management device 270 of the individual vehicle (step S216).

Subsequently, the terminal device 500 performs user authentication with the event vehicle dispatch device 100B (step S218). Subsequently, the terminal device 500 sets a destination and transmits the set destination to the event vehicle dispatch device 100B (step S220). The event vehicle dispatch device 100B transmits the latest dynamic event status to the terminal device 500 (step S222). The terminal device 500 transmits a participation desire based on the latest event status in the case of participation in the event and transmits information indicating that an additional service (for example, pick-up) is desired to the event vehicle dispatch device 100B in the case of the desire of the additional service in accordance with the participation desire (step S224). When the additional service is ordered, the event vehicle dispatch device 100B transmits order information to the service provider device 700 (step S226). The service provider device 700 receives the order of the service, prepares for the vehicle, and transmits a signal indicating the preparation of the vehicle to the event vehicle dispatch device 100B (step S228).

Subsequently, the event vehicle dispatch device 100B sets a route for the prepared vehicle (step S230). Subsequently, the event vehicle dispatch device 100B transmits contents information to be output to the compartmented region of the vehicle 200 and transmits permission to display contents to the terminal device 300 (step S232). The terminal device 300 permits control of the compartment such as display, a function, or the like in response to an instruction from an event owner (or a store vehicle) to the vehicle of the participating user and transmits the compartment information to the vehicle management device 270 (step S234). When the vehicle management device 270 acquires the compartment information, the vehicle 200 performs predetermined control in response to this information and (step S236).

When the contents information is acquired from the event vehicle dispatch device 100B, the terminal device 300 transmits external display control for the acquired contents to the vehicle management device 270 (step S238). When the contents information is acquired, the vehicle management device 270 causes the vehicle exterior display of the HMI 273 to display the contents responded to the contents information (step S240).

Thereafter, the vehicle management device 270 performs boarding control so that the user U can board (step S242). Subsequently, the terminal device 300 orders an additional service by inviting another service provider at any timing (step S244). When the order of the additional service is received, the service provider device 700 transmits the fact indicating the reception of the order to the terminal device 300, transmits content of the additional service to the vehicle management device 270 of the same vehicle or another vehicle, and causes the vehicle management device 270 to perform the additional service (step S246). Subsequently, the vehicle management device 270 performs getting-out control of the user U (step S248). The service after the boarding may be continued. For example, the event vehicle dispatch device 100B suggests an event status to the terminal device 500 (step S250). Thus, for example, by transmitting pick-up information or the like for return to the terminal device 500, it is possible to guide the user U to a specific vehicle or store. In addition, each of the above-described first to third embodiments may be combined with some or all of other embodiments.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claim is:

1. An event vehicle dispatch device comprising:
    an event notifier configured to notify a plurality of vehicles or owners of the vehicles of an event held in an area in which the plurality of vehicles are able to park in an order of proximity of the vehicles to the area; and
    an adjuster configured to adjust the number of vehicles corresponding to vehicle attributes of vehicles arriving at the area based on the vehicle attributes of each of the plurality of vehicles based on vehicle allocation information stored in a memory, wherein the vehicles or owners notified by the event notifier is based on the number of vehicles.

2. The event vehicle dispatch device according to claim 1, further comprising:
    an instructor configured to instruct the plurality of vehicles of parking positions of the plurality of vehicles so that the plurality of vehicles arriving at the area are located at predetermined positions inside the area.

3. The event vehicle dispatch device according to claim 1, wherein the event notifier notifies a vehicle or an owner of the vehicle within a predetermined distance from a position of the area of the event.

4. The event vehicle dispatch device according to claim 1, wherein the event notifier notifies the number of vehicles that are able to park in the area of the event.

5. The event vehicle dispatch device according to claim 1, wherein the vehicle is an automated driving vehicle.

6. The event vehicle dispatch device according to claim 5, wherein the automated driving vehicle includes a towing vehicle that tows a trailer.

7. The event vehicle dispatch device according to claim 1, wherein the event notifier notifies of information regarding an event held in the area of a user registered in advance and acquires from the user information regarding whether the user desires pick-up in the area.

8. The event vehicle dispatch device according to claim 1, further comprising:
    a pick-up manager configured to cause a vehicle participating in the event to pick up a user of the event between a predetermined place and the area.

9. An event vehicle dispatch method causing a computer to:
    notify a plurality of vehicles or owners of the vehicles of an event held in an area in which the plurality of vehicles are able to park in an order of proximity of the vehicles from to area; and
    adjust the number of vehicles corresponding to vehicle attributes of vehicles arriving at the area based on the vehicle attributes of each of the plurality of vehicles based on vehicle allocation information stored in a memory of the computer, wherein the vehicles or owners notified is based on the number of vehicles.

10. A non-transitory computer-readable storage medium that stores a program to be executed by a computer to perform at least:
    notify a plurality of vehicles or owners of the vehicles of an event held in an area in which the plurality of vehicles are able to park in an order of proximity of the vehicles to the area; and
    adjust the number of vehicles corresponding to vehicle attributes of vehicles arriving at the area based on the vehicle attributes of each of the plurality of vehicles based on vehicle allocation information stored in a memory. wherein the vehicles or owners notified is based on the number of vehicles.

* * * * *